(12) United States Patent
Wells et al.

(10) Patent No.: US 10,419,813 B2
(45) Date of Patent: *Sep. 17, 2019

(54) PASSIVE MULTI-PORT ENTRY ADAPTER FOR PRESERVING DOWNSTREAM CATV SIGNAL STRENGTH

(71) Applicant: PPC Broadband, Inc., East Syracuse, NY (US)

(72) Inventors: Chad T. Wells, Centennial, CO (US); John M. Egan, Jr., Franktown, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/880,231

(22) Filed: Jan. 25, 2018

(65) Prior Publication Data

US 2018/0152754 A1 May 31, 2018

Related U.S. Application Data

(63) Continuation of application No. 15/722,302, filed on Oct. 2, 2017, now Pat. No. 10,154,302, which is a
(Continued)

(51) Int. Cl.
*H04N 7/18* (2006.01)
*H04N 21/436* (2011.01)
(Continued)

(52) U.S. Cl.
CPC ... *H04N 21/43615* (2013.01); *H04L 12/2801* (2013.01); *H04N 7/104* (2013.01);
(Continued)

(58) Field of Classification Search
CPC ............................... H04N 21/61; H04N 21/63
See application file for complete search history.

(56) References Cited

U.S. PATENT DOCUMENTS 2,662,217 A 12/1953 Roberts
3,790,909 A 2/1974 LeFevre
(Continued)

FOREIGN PATENT DOCUMENTS

CN 200941620 Y 8/2007
CN 201048432 Y 4/2008
(Continued)

OTHER PUBLICATIONS

Pre-Interview First Office Action dated Aug. 15, 2018, U.S. Appl. No. 15/886,800, filed Feb. 1, 2018, pp. 1-30.
(Continued)

*Primary Examiner* — Gigi L Dubasky
(74) *Attorney, Agent, or Firm* — MH2 Technology Law Group LLP

(57) ABSTRACT

An entry adapter for controlling upstream and downstream communications between a cable television (CATV) network and a client multimedia over coaxial alliance (MoCA) network including port means for allowing downstream and upstream CATV signals to be distributed between a CATV network and a plurality of MoCA client devices of a client MoCA network, two-way, high/low frequency band isolation and limited distribution means for allowing CATV network signals to communicate with the client devices, blocking client network signals from being communicated to the CATV network, splitting a network signal into reduced signal-strength network signal copies communicated to the port means, and isolating network signals into a high and low frequency band ranges so as to allow low frequency band CATV network signals to communicate with the MoCA client devices while blocking high frequency band client MoCA network signals from being communicated to the CATV network.

221 Claims, 8 Drawing Sheets

Related U.S. Application Data continuation of application No. 15/133,948, filed on Apr. 20, 2016, now Pat. No. 9,781,472, which is a continuation of application No. 13/863,693, filed on Apr. 16, 2013, now Pat. No. 9,351,051, which is a continuation-in-part of application No. 12/704,833, filed on Feb. 12, 2010, now Pat. No. 8,429,695, which is a continuation-in-part of application No. 12/255,008, filed on Oct. 21, 2008, now Pat. No. 8,286,209, said application No. 13/863,693 is a continuation-in-part of application No. 13/688,420, filed on Nov. 29, 2012, now Pat. No. 9,167,286, which is a continuation-in-part of application No. 12/563,719, filed on Sep. 21, 2009, now Pat. No. 8,356,322.

(51) Int. Cl.
*H04N 21/63* (2011.01)
*H04L 12/28* (2006.01)
*H04N 21/61* (2011.01)
*H04N 7/10* (2006.01)

(52) U.S. Cl.
CPC ..... *H04N 21/6118* (2013.01); *H04N 21/6168* (2013.01); *H04N 21/63* (2013.01)

(56) References Cited

U.S. PATENT DOCUMENTS

| | | | |
|---|---|---|---|
| 3,939,431 | A | 2/1976 | Cohlman |
| 4,027,219 | A | 5/1977 | Van Alphen et al. |
| 4,306,403 | A | 12/1981 | Hubbard et al. |
| 4,344,499 | A | 8/1982 | Van der Lely et al. |
| 4,512,033 | A | 4/1985 | Schrock |
| 4,520,508 | A | 5/1985 | Reichert, Jr. |
| 4,648,123 | A | 3/1987 | Schrock |
| 4,677,390 | A | 6/1987 | Wagner |
| 4,715,012 | A | 12/1987 | Mueller, Jr. |
| 4,961,218 | A | 10/1990 | Kiko |
| 4,982,440 | A | 1/1991 | Dufresne et al. |
| 5,010,399 | A | 4/1991 | Goodman et al. |
| 5,126,686 | A | 6/1992 | Tam |
| 5,126,840 | A | 6/1992 | Dufresne et al. |
| 5,214,505 | A | 5/1993 | Rabowsky et al. |
| 5,231,660 | A | 7/1993 | West, Jr. |
| 5,245,300 | A | 9/1993 | Sasaki et al. |
| 5,369,642 | A | 11/1994 | Shioka et al. |
| 5,485,630 | A | 1/1996 | Lee et al. |
| 5,548,255 | A | 8/1996 | Spielman |
| 5,557,319 | A | 9/1996 | Gurusami et al. |
| 5,557,510 | A | 9/1996 | McIntyre et al. |
| 5,604,528 | A | 2/1997 | Edwards et al. |
| 5,719,792 | A | 2/1998 | Bush |
| 5,740,044 | A | 4/1998 | Ehrenhardt et al. |
| 5,745,836 | A | 4/1998 | Williams |
| 5,745,838 | A | 4/1998 | Tresness et al. |
| 5,815,794 | A | 9/1998 | Williams |
| 5,839,052 | A | 11/1998 | Dean et al. |
| 5,893,024 | A | 4/1999 | Sanders et al. |
| 5,937,330 | A | 8/1999 | Vince et al. |
| 5,950,111 | A | 9/1999 | Georger et al. |
| 5,970,053 | A | 10/1999 | Schick et al. |
| 6,012,271 | A | 1/2000 | Wilkens et al. |
| 6,014,547 | A | 1/2000 | Caporizzo et al. |
| 6,049,693 | A | 4/2000 | Baran et al. |
| 6,069,960 | A | 5/2000 | Mizukami et al. |
| 6,094,211 | A | 7/2000 | Baran et al. |
| 6,101,932 | A | 8/2000 | Wilkens |
| 6,128,040 | A | 10/2000 | Shinbori et al. |
| 6,129,187 | A | 10/2000 | Bellanger et al. |
| 6,173,225 | B1 | 1/2001 | Stelzle et al. |
| 6,185,432 | B1 | 2/2001 | Vembu |
| 6,205,138 | B1 | 3/2001 | Nihal et al. |
| 6,229,375 | B1 | 5/2001 | Koen |
| 6,348,837 | B1 | 2/2002 | Ibelings |
| 6,348,955 | B1 | 2/2002 | Tait |
| 6,373,349 | B2 | 4/2002 | Gilbert |
| 6,377,316 | B1 | 4/2002 | Mycynek et al. |
| 6,388,539 | B1 | 5/2002 | Rice |
| 6,425,132 | B1 | 7/2002 | Chappell |
| 6,430,904 | B1 | 8/2002 | Coers et al. |
| 6,495,998 | B1 | 12/2002 | Terreault |
| 6,498,925 | B1 | 12/2002 | Tauchi |
| 6,510,152 | B1 | 1/2003 | Gerszberg et al. |
| 6,546,705 | B2 | 4/2003 | Scarlett et al. |
| 6,550,063 | B1 | 4/2003 | Matsuura |
| 6,560,778 | B1 | 5/2003 | Hasegawa |
| 6,570,928 | B1 | 5/2003 | Shibata |
| 6,587,012 | B1 | 7/2003 | Farmer et al. |
| 6,622,304 | B1 * | 9/2003 | Carhart ............... H04L 12/2803 348/E7.05 |
| 6,640,338 | B1 | 10/2003 | Shibata |
| 6,678,893 | B1 | 1/2004 | Jung |
| 6,683,513 | B2 | 1/2004 | Shamsaifar et al. |
| 6,725,462 | B1 | 4/2004 | Kaplan |
| 6,728,968 | B1 | 4/2004 | Abe et al. |
| 6,737,935 | B1 | 5/2004 | Shafer |
| 6,757,910 | B1 | 6/2004 | Bianu |
| 6,758,292 | B2 | 7/2004 | Shoemaker |
| 6,804,828 | B1 | 10/2004 | Shibata |
| 6,843,044 | B2 | 1/2005 | Clauss |
| 6,845,232 | B2 | 1/2005 | Darabi |
| 6,920,614 | B1 | 1/2005 | Schindler et al. |
| 6,868,552 | B1 | 3/2005 | Masuda et al. |
| 6,877,166 | B1 | 4/2005 | Roeck et al. |
| 6,915,530 | B1 | 7/2005 | Kauffman et al. |
| 6,928,175 | B1 | 8/2005 | Bader et al. |
| 6,942,595 | B2 | 9/2005 | Hrazdera |
| 7,003,275 | B1 | 2/2006 | Petrovic |
| 7,029,293 | B2 | 4/2006 | Shapson et al. |
| 7,039,432 | B2 | 5/2006 | Stater et al. |
| 7,048,106 | B2 | 5/2006 | Hou |
| 7,127,734 | B1 * | 10/2006 | Amit ................... H04L 12/2801 725/80 |
| 7,162,731 | B2 | 1/2007 | Reidhead et al. |
| 7,254,827 | B1 | 8/2007 | Terreault |
| 7,283,479 | B2 | 10/2007 | Ljungdahl et al. |
| 7,399,255 | B1 | 7/2008 | Johnson et al. |
| 7,404,355 | B2 | 7/2008 | Viaud et al. |
| 7,416,068 | B2 | 8/2008 | Ray et al. |
| 7,454,252 | B2 | 11/2008 | Ei-Sayed |
| 7,464,526 | B2 | 12/2008 | Coenen |
| 7,505,819 | B2 | 3/2009 | Ei-Sayed |
| 7,508,284 | B2 | 3/2009 | Shafer |
| 7,530,091 | B2 | 5/2009 | Vaughan |
| 7,592,883 | B2 | 9/2009 | Shafer |
| 7,675,381 | B2 * | 3/2010 | Lin ........................ H03H 7/46 333/101 |
| 7,742,777 | B2 | 6/2010 | Strater et al. |
| 7,783,195 | B2 | 8/2010 | Riggsby |
| 8,179,814 | B2 | 5/2012 | Shafer et al. |
| 8,181,208 | B1 * | 5/2012 | Elwardani ............. H04N 7/106 725/144 |
| 8,286,209 | B2 | 10/2012 | Egan, Jr. |
| 8,356,322 | B2 | 1/2013 | Wells et al. |
| 8,429,695 | B2 | 4/2013 | Halik |
| 8,510,782 | B2 | 8/2013 | Wells et al. |
| 8,752,114 | B1 | 6/2014 | Shapson et al. |
| 9,167,286 | B2 | 10/2015 | Wells |
| 9,351,051 | B2 | 5/2016 | Wells |
| 9,516,376 | B2 | 12/2016 | Wells |
| 9,781,472 | B2 | 10/2017 | Wells |
| 2001/0016950 | A1 | 8/2001 | Matsuura |
| 2002/0069417 | A1 | 6/2002 | Kliger |
| 2002/0141347 | A1 | 10/2002 | Harp |
| 2002/0144292 | A1 | 10/2002 | Uemura et al. |
| 2002/0166124 | A1 | 11/2002 | Gurantz et al. |
| 2002/0174423 | A1 | 11/2002 | Fifield et al. |
| 2003/0005450 | A1 | 1/2003 | Smith |
| 2003/0084458 | A1 | 5/2003 | Ljungdahl et al. |
| 2004/0147273 | A1 | 7/2004 | Morphy |
| 2004/0172659 | A1 | 9/2004 | Ljungdahl et al. |
| 2004/0229561 | A1 | 11/2004 | Cowley et al. |

(56) References Cited

U.S. PATENT DOCUMENTS

| | | |
|---|---|---|
| 2005/0034168 A1 | 2/2005 | Beveridge |
| 2005/0047051 A1 | 3/2005 | Marland |
| 2005/0144649 A1 | 6/2005 | Bertonis |
| 2005/0183130 A1 | 8/2005 | Sadja et al. |
| 2005/0210977 A1 | 9/2005 | Yan |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0041918 A9 | 2/2006 | Currivan et al. |
| 2006/0117371 A1 | 6/2006 | Margulis |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0013612 A1* | 1/2008 | Miller .................. H04L 12/2801 375/224 |
| 2008/0022344 A1 | 1/2008 | Riggsby |
| 2008/0040764 A1 | 2/2008 | Weinstein et al. |
| 2008/0120667 A1* | 5/2008 | Zaltsman ............ H04L 12/2856 725/110 |
| 2008/0127287 A1 | 5/2008 | Alkan et al. |
| 2008/0157898 A1 | 7/2008 | Palinkas et al. |
| 2008/0168518 A1 | 7/2008 | Hsue et al. |
| 2008/0225902 A1* | 9/2008 | Chung ..................... H04J 1/08 370/537 |
| 2008/0247401 A1 | 10/2008 | Bhal et al. |
| 2008/0247541 A1 | 10/2008 | Cholas et al. |
| 2008/0271094 A1* | 10/2008 | Kliger ................. H04L 12/2801 725/80 |
| 2008/0313691 A1 | 12/2008 | Cholas et al. |
| 2009/0031391 A1 | 1/2009 | Urbanek |
| 2009/0047919 A1 | 2/2009 | Phillips et al. |
| 2009/0077608 A1* | 3/2009 | Romerein .............. H03H 7/463 725/127 |
| 2009/0153263 A1 | 6/2009 | Lin |
| 2009/0165070 A1* | 6/2009 | McMullin ................ H04B 1/10 725/125 |
| 2009/0180782 A1* | 7/2009 | Bernard ........... H04B 10/25751 398/140 |
| 2009/0217325 A1 | 8/2009 | Kliger et al. |
| 2009/0320086 A1* | 12/2009 | Rijssemus ........... H04L 12/2861 725/127 |
| 2010/0017842 A1 | 1/2010 | Wells |
| 2010/0095344 A1 | 4/2010 | Newby |
| 2010/0100918 A1 | 4/2010 | Egan |
| 2010/0125877 A1 | 5/2010 | Wells |
| 2010/0146564 A1 | 6/2010 | Ralik |
| 2010/0162340 A1 | 6/2010 | Riggsby |
| 2010/0194489 A1 | 8/2010 | Kearns et al. |
| 2010/0225813 A1 | 9/2010 | Hirono et al. |
| 2011/0002245 A1 | 1/2011 | Wall et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells |
| 2011/0181371 A1 | 7/2011 | Alkan |
| 2011/0258677 A1 | 10/2011 | Shafer |
| 2012/0054805 A1 | 3/2012 | Shafer |
| 2012/0054819 A1 | 3/2012 | Alkan |
| 2012/0081190 A1 | 4/2012 | Rijssemus |
| 2012/0159556 A1 | 6/2012 | Alkan |
| 2012/0331501 A1 | 12/2012 | Shafer |
| 2013/0081096 A1 | 3/2013 | Wells et al. |
| 2013/0181789 A1 | 7/2013 | Rijssemus |
| 2013/0227632 A1 | 8/2013 | Wells et al. |
| 2013/0283334 A1* | 10/2013 | Tsao .................. H04N 21/6118 725/149 |

FOREIGN PATENT DOCUMENTS

| | | |
|---|---|---|
| JP | 55-080989 A | 6/1980 |
| JP | 55-132126 A | 10/1980 |
| JP | 58-99913 | 12/1981 |
| JP | 57-091055 A | 6/1982 |
| JP | 58-101582 A | 6/1983 |
| JP | 59026709 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004-080483 | 3/2004 |
| JP | 2005-005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

OTHER PUBLICATIONS

Notice of Allowance dated Sep. 28, 2018, U.S. Appl. No. 15/880,363, filed Jan. 25, 2018, pp. 1-70.
First Action Interview Office action dated Sep. 21, 2018, U.S. Appl. No. 15/880,166, filed Jan. 25, 2018, pp. 1-14.
Notice of Allowance dated Oct. 17, 2018, U.S. Appl. No. 15/890,573, filed Feb. 7, 2018, pp. 1-20.
Final Office Action dated Jan. 30, 2019, U.S. Appl. No. 15/891,441, filed Feb. 8, 2018, pp. 1-24.
Pre-Interview First Office Action dated Jun. 8, 2018, U.S. Appl. No. 15/890,573, filed Feb. 7, 2018, pp. 1-24.
Pre-Interview First Office Action dated Jun. 18, 2018, U.S. Appl. No. 15/891,441, filed Feb. 8, 2018, pp. 1-24.
Shane Thomas (Authorized Officer), International Search Report and Written Opinion dated Nov. 2, 2017, PCT Application No. PCT/US2017/040260, filed Jun. 30, 2017, pp. 1-18.
Wells, "Cable Television Entry Adapter", U.S. Appl. No. 13/245,510, filed Sep. 26, 2011.
Non-Final Office Action dated Feb. 26, 2016, U.S. Appl. No. 14/881,686, filed Oct. 13, 2015, pp. 1-6.
Non-Final Office Action dated May 18, 2018, U.S. Appl. No. 15/722,302, filed Oct. 2, 2017, pp. 1-34.
Pre-Interview First Office Action dated Jul. 16, 2018, U.S. Appl. No. 15/880,166, filed Jan. 25, 2018, pp. 1-10.
Pre-Interview First Office Action dated Aug. 3, 2018, U.S. Appl. No. 15/880,363, filed Jan. 25, 2018, pp. 1-30.
First Action Interview Office Action dated Aug. 10, 2018, U.S. Appl. No. 15/890,573, filed Feb. 7, 2018, pp. 1-15.
First Action Interview Office Action dated Aug. 10, 2018, U.S. Appl. No. 15/891,441, filed Feb. 8, 2018, pp. 1-15.
Pre-Interview First Office Action dated Aug. 10, 2018, U.S. Appl. No. 15/886,788, filed Feb. 1, 2018, pp. 1-30.
Notice of Allowance dated Oct. 18, 2018, U.S. Appl. No. 15/880,166, filed Jan. 25, 2018, pp. 1-38.
Notice of Allowance dated Oct. 18, 2018, U.S. Appl. No. 15/886,788, filed Feb. 1, 2018, pp. 1-30.
Author Unknown, Office Action dated Jul. 31, 2014, Chinese Application No. 201110037086.1, filed Jan. 21, 2011, pp. 1-6.
Sung Lark Kwon (Authorized Officer), International Search Report dated May 31, 2011, PCT Application No. PCT/US2010/049568, filed Sep. 21, 2010, pp. 1-3.
Office Action Summary dated Mar. 6, 2012, U.S. Appl. No. 12/563,719, filed Sep. 21, 2009, pp. 1-13.
Office Action Summary dated Jan. 23, 2012, U.S. Appl. No. 12/250,229, filed Oct. 13, 2008, pp. 1-25.
Office Action Summary dated Nov. 11, 2011, U.S. Appl. No. 12/255,008, filed Oct. 21, 2008, pp. 1-22.

* cited by examiner

PASSIVE MULTI-PORT ENTRY ADAPTER FOR PRESERVING DOWNSTREAM CATV SIGNAL STRENGTH

CROSS-REFERENCE TO RELATED APPLICATIONS

This application is a continuation of U.S. patent application Ser. No. 15/722,302, filed on Oct. 2, 2017, which is a continuation of U.S. patent application Ser. No. 15/133,948, filed Apr. 20, 2016, now U.S. Pat. No. 9,781,472, which is a continuation of U.S. patent application Ser. No. 13/863,693, filed Apr. 16, 2013, now U.S. Pat. No. 9,351,051, which is a continuation-in-part of U.S. patent application Ser. No. 12/704,833, filed Feb. 12, 2010, now issued as U.S. Pat. No. 8,429,695, and a continuation-in part of U.S. patent application Ser. No. 12/255,008, filed Oct. 21, 2008, now issued as U.S. Pat. No. 8,286,209. U.S. patent application Ser. No. 13/863,693, now U.S. Pat. No. 9,351,051, is also a continuation-in-part of U.S. patent application Ser. No. 13/688,420, filed Nov. 29, 2012, now issued as U.S. Pat. No. 9,167,286, which is a continuation of U.S. patent application Ser. No. 12/563,719, filed Sep. 21, 2009, now U.S. Pat. No. 8,356,322. Each of these applications is incorporated by reference herein in its entirety.

This invention relates to cable television (CATV) and to in-home entertainment networks which share existing coaxial cables within the premises for CATV signal distribution and in-home network communication signals. More particularly, the present invention relates to a new and improved passive entry adapter between a CATV network and the in-home network which minimizes the CATV signal strength reduction even when distributed among multiple subscriber or multimedia devices within the subscriber's premises or home.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (homes and offices) of subscribers to the CATV services. The downstream signals transfer multimedia content to subscriber equipment, such as television sets, telephone sets and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VoIP) telephone sets use the CATV infrastructure and the public Internet as the communication medium for transmitting two-way telephone conversations.

To permit simultaneous communication of upstream and downstream CATV signals and the interoperability of the subscriber equipment and the equipment associated with the CATV network infrastructure outside of subscriber premises, the downstream and upstream CATV signals are confined to two different frequency bands. The downstream frequency band is within the range of 54-1002 megahertz (MHz) and the upstream frequency band is within the range of 5-42 MHz, in most CATV networks. The entire CATV frequency band is therefore 5-1002 MHz.

The downstream signals are delivered from the CATV network infrastructure to the subscriber premises at a CATV entry adapter, which is also commonly referred to as an entry device, terminal adapter or a drop amplifier. The CATV entry adapter is usually a multi-port device which provides a multiplicity of ports or connectors for connecting coaxial cables. A separate coaxial cable is connected to each of the ports and extends within the subscriber premises to the location of the subscriber equipment. Some homes have coaxial cables extending to cable outlets in almost every room, because of the many different types of subscriber equipment used in different rooms. For example, television sets are commonplace throughout the home. The multiple ports of the CATV entry adapter deliver downstream CATV at each cable outlet and conduct upstream CATV signals back through the premises coaxial cables to the CATV entry adapter, which delivers the upstream CATV signals to the CATV network.

In addition to television sets, computers and telephones, a relatively large number of other entertainment and multimedia devices are available for use in homes. For example, a digital video recorder (DVR) is used to store broadcast programming, still photography and moving pictures in a memory medium so that the content can be replayed on a display or television set at a later time selected by the user. As another example, computer games are also played at displays or on television sets. Such computer games may be obtained or played over the Internet from the CATV network or from media played on play-back devices or game consoles connected to displays or television sets. As a further example, receivers which receive satellite-broadcast signals may be distributed for viewing or listening throughout the home. These types of devices, including the more-conventional television sets, telephone sets and devices connected to the Internet by the CATV network, are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. The MoCA in-home network uses the subscriber premise or in-home coaxial cable infrastructure originally established for distribution of CATV signals within the subscriber premises, principally because that cable infrastructure already exists in most homes and is capable of carrying much more information than is carried in the CATV frequency band. A MoCA network is established by connecting MoCA interface devices at the cable outlets in the rooms of the subscriber premises. The MoCA network is used to transmit multimedia content from one MoCA interface device to another.

The MoCA interface devices implement a MoCA communication protocol which encapsulates the multimedia content normally sent and received by the multimedia devices within MoCA packets and then communicates these MoCA packets between selected ones of the other MoCA interfaces devices connected at other cable outlets. The receiving MoCA interface device removes the encapsulated multimedia content, and delivers it to the connected computer, digital television or set-top box or other multimedia device from which then presents that multimedia content.

Each MoCA interface device is capable of communicating with every other MoCA interface device in the MoCA network to deliver the multimedia content throughout the home or subscriber premises. The entertainment or multimedia content that is available from one multimedia device can be displayed, played or otherwise used at a different location within the home, without having to physically relocate the multimedia device from one location to another within the home. The in-home network communication of multimedia content is considered beneficial in more fully utilizing the multimedia devices present in modern homes. The MoCA interface devices also pass the upstream and downstream CATV signals between the CATV entry adapter and the subscriber devices.

Since the MoCA network may function simultaneously with the normal operation of the CATV services, the MoCA signals communicated between MoCA interface devices utilize a frequency range of 1125-1525 MHz, which is outside of the frequency band of CATV signals. This so-called band of MoCA signals is divided into eight different frequency ranges, D1-D8, and these eight different D frequency ranges are used to assure communication between the selected MoCA interface devices. For example, the D-1 band at 1125-1175 MHz may be used to communicate CATV television programming content between a MoCA interface device connected to a set-top box in a main room of the house and another MoCA interface device connected to a television set in bedroom of the house, while a MoCA interface device connected to a computer gaming multimedia device in a basement room of the house simultaneously communicates computer game content over the D-6 band at 1375-1425 MHz to a computer located in a recreation room of the house. The MoCA frequency band also includes other frequency ranges outside of the CATV frequency band, but the D band is is used to establish connections and communicate content between the MoCA interface devices.

Using the in-home coaxial cable as the principal communication medium substantially simplifies the implementation of the MoCA network, but there are certain disadvantages in doing so. The D band MoCA frequencies have the capability of passing through the CATV entry adapter and entering the CATV network where they may then enter a nearby subscriber's premises. The presence of the MoCA signals at the nearby subscriber's premises compromises the privacy and security of the information originally intended to be confined within the original subscriber premises. The MoCA signals from the original subscriber premises which enter through the CATV network to the nearby subscriber premises also have the potential to adversely affect the performance of a MoCA network in nearby subscriber's premises. The conflict of the MoCA signals from the original and nearby subscriber premises may cause the MoCA interface devices to malfunction or not operate properly on a consistent basis.

Another undesirable aspect of using a MoCA for communication between the various multimedia devices is that a relatively large MoCA network with many cable outlet ports has the effect of deteriorating the strength of the downstream CATV signal. Because in-home multimedia devices frequently require access to the CATV network in order to send upstream CATV signals as well is to receive downstream CATV signals, the in-home coaxial cable infrastructure must commonly connect all of the CATV cables and CATV ports within the home to a common connection with the drop cable that supplies the CATV signal and services to the home. The common connection is usually achieved in the CATV entry adapter, which provides output ports that connect to the coaxial cables extending within the home to each separate location or room. A splitter within the CATV entry adapter divides the CATV downstream signals into two or more reduced-power copies of the input signal, and supplies each copy to a separate outlet port. Similarly, upstream signals from the subscriber equipment connected to each of the coaxial cables are combined in the splitter and then passed upstream through the CATV entry adapter into the CATV network.

The typical splitter is passive, which means that the power of the input signal is divided among the copies of the output signals split from the input signal. Each copy of the signal therefore has diminished power or strength, and the lower strength copies will not have the same quality as the input signal. In general terms, the quality is the strength of the signal relative to the strength of the inherent ambient noise. Since the inherent ambient noise generally cannot be diminished and is usually a constant, lowering the strength of the signal relative to the noise reduces the signal-to-noise ratio. The signal-to-noise ratio is a recognized measure of the quality of a signal. A lower signal-to-noise ratio represents a lesser quality signal.

Because many homes require a relatively large number of cable outlet ports, for example six or more, the downstream CATV signal must be split into a comparable relatively large number of copies. The greater number of signal splitters required to generate the requisite number of separate copies of the downstream CATV signal diminishes the strength of the downstream signal copies. The quality of CATV service available in an in-home network with a relatively large number of cable output ports therefore suffers, because the strength of the CATV signal available at each of these ports is substantially diminished due to the extent of signal splitting required.

On the other hand, Upstream CATV signals from the subscriber equipment do not occur as frequently as downstream CATV signals. Furthermore, upstream signals are generally of a higher power because they are generated immediately by the subscriber equipment within the home. Consequently, the reduction in CATV signal strength applies principally to downstream CATV signals, which of course provide the multimedia content to the subscriber. It is the quality of the multimedia content observed by the subscriber that forms the basis for the subscriber's opinion of quality of service.

To compensate for downstream CATV signal strength reduction caused by splitting, some entry adapters include amplifiers to increase the strength of the copies of the downstream CATV signals. Of course, including an amplifier along with the signal splitter makes the signal transmission dependent upon the presence of adequate electrical power to operate the amplifier. The power for the amplifier is derived from commercial sources within the household. If the commercial power supply is temporarily interrupted, or if the power supply equipment within the home ceases operating properly, the customer perceives a CATV problem and reports the problem to the CATV service provider. The CATV service provider must thereafter send a service or repair person to the home of the subscriber in order to identify and remedy the problem. Such service calls are a significant expense for a CATV service provider. CATV service providers therefore attempt to eliminate as many of the potential points of failure as possible in the equipment supplied by the CATV service provider, to reduce service calls and repair costs. Including an amplifier in a CATV entry adapter creates a potential point of failure, and for that reason most CATV service providers wish to avoid using CATV entry adapters with amplifiers. However, in those relatively large in-home networks with multiple outlets for connecting multiple multimedia devices, there has been little previous choice but to use amplifiers in conjunction with splitters in order to obtain the desired downstream CATV signal strength that represents a high quality of service.

SUMMARY OF THE INVENTION

The present invention is directed to a cable television (CATV) entry adapter which beneficially provides a high quality and strength downstream CATV signal to multiple subscriber devices while simultaneously contributing to and promoting the establishment of a multimedia in-home network. The CATV entry adapter is preferably passive without an amplifier, and passes the in-home network communication signals between the multiple subscriber devices, and passes the downstream and upstream CATV signals to the subscriber equipment and the CATV network. The in-home network communication signals are effectively communicated in the in-home network and the multimedia content from the upstream and downstream CATV signals is effectively made available to all of the subscriber equipment and to the CATV network without diminishing the quality or strength of the CATV signals to the point where the quality of service is compromised. As a passive device, the CATV entry adapter of the present invention requires no external power source, which eliminates unnecessary service calls. In addition, critical communications over the CATV network, such as "life-line" phone service, are preserved during transmission over the CATV network to ensure such critical communications are not adversely. The CATV entry adapter also minimizes the risks of malfunction or failure for which the CATV service provider is responsible.

In accordance with these and other features, one aspect of the invention involves a cable television (CATV) entry adapter for conducting downstream and upstream CATV signals between a CATV network and at a least one subscriber device at subscriber premises and for conducting in-home network signals between multiple subscriber devices at the subscriber premises connected in an in-home network. The CATV signals occupy a CATV frequency band which is different from an in-home network frequency band occupied by the in-home network signals. The in-home network includes a network interface connected to each subscriber device by which to generate and communicate the network signals between the subscriber devices in the in-home network. The CATV entry adapter comprises a CATV entry port for connection to the CATV network, and a plurality of network ports each for connection to the network interface to which each subscriber device is connected. The CATV entry adapter also includes a signal splitter which has an input terminal and two output terminals. The signal splitter operatively splits a signal received at its input terminal into reduced-power copies of the input signal supplied at each of its output terminals. The signal splitter also communicates signals received at each output terminal to the input terminal and to the other output terminal. The CATV entry adapter also includes an in-home network frequency band rejection device connected between the CATV entry port and the input port of the signal splitter. The in-home network frequency band rejection device substantially blocks transmission of the in-home network signals therethrough to the CATV entry port and the CATV network.

Another aspect of the invention involves an in-home network for distributing multimedia content to subscriber devices. The multimedia content is obtained from CATV signals communicated over a CATV network and from a subscriber device connected to the in-home network. The in-home network comprises a CATV entry adapter having a CATV entry port and a plurality of network ports. The CATV entry port is connected to the CATV network for receiving multimedia content from CATV signals communicated over the CATV network. The in-home network also comprises a plurality of in-home network interfaces, each of which is connected to a different one of the plurality of network ports. Each of the network interfaces communicate multimedia content to the subscriber devices to which each network interface is connected. All of the network interfaces communicate multimedia content between one another in network signals communicated between the network interfaces. At least one of the network interfaces sends and receives CATV signals and communicates the multimedia content contained in the CATV signals to the subscriber device to which the one network interface is connected, and communicates the multimedia content obtained from the CATV signals in network signals communicated through the CATV entry adapter to another network interface. Each of the network interfaces communicates multimedia content obtained from a subscriber device connected to that network interface in network signals communicated through the CATV entry adapter to another network interface. The network signals are located within a network frequency band which is different from a CATV frequency band within which the CATV signals are located.

A further aspect of the invention involves a method of conducting information contained in downstream and upstream CATV signals between a CATV network and at a least one subscriber device at a subscriber premises and of conducting information contained in network signals between multiple subscriber devices at the subscriber premises connected in an in-home network. The method comprises connecting the CATV entry adapter to receive and transmit CATV signals from and to the CATV network, respectively; connecting in-home network interfaces to each subscriber device to form the in-home network among the subscriber devices to which network interfaces are attached; connecting the CATV entry adapter as a hub in the in-home network to pass network signals between network interfaces; confining the network signals to an end-home network frequency band that is different from a CATV frequency band within which the CATV signals are confined; connecting the CATV adapter to at least one network interface to receive and transmit CATV signals supplied from and to the CATV entry adapter; and preventing transmission of the network signals within the CATV entry adapter onto the CATV network.

One subsidiary aspect of the invention which relates to blocking or preventing the transmission of network signals onto the CATV network, involves a frequency rejection device which comprises only passive electronic components, or which functions without a power source separate from the CATV signals and the in-home network signals. The frequency rejection device may take the form of a frequency rejection filter, or the frequency rejection device may take the form of at least one diplexer which divides frequencies into separate frequency bands, and is connected to conduct the network signals in the network frequency band between network interfaces and to conduct the CATV signals in the CATV frequency band to and from the CATV network.

Another subsidiary aspect of the invention involves a server network interface and at least one client network interface. The server network interface sends and receives downstream and upstream CATV signals and network signals to communicate information contained in the CATV and network signals to the subscriber device to which the server network interface is connected. Each client network interface sends and receives network signals to communicate information contained in the network signals to the subscriber device to which each client network interface is connected. The server network interface also has a capability for storing information obtained from downstream CATV signals and subsequently supplying network signals to a client network interface which contain the information stored from the downstream CATV signals.

An additional subsidiary aspect of the invention involves connecting an embedded multimedia terminal adapter (eMTA)-compatible subscriber device including a modem and telephone set to the CATV entry adapter, and splitting downstream CATV signals into reduced-power copies and supplying one of the copies to the eMTA-compatible device.

A more complete appreciation of the present invention, as well as the manner in which the present invention achieves the above and other improvements, can be obtained by reference to the following detailed description of presently preferred embodiments taken in conjunction with the accompanying drawings, which are briefly summarized below, and by reference to the appended claims.

DETAILED DESCRIPTION

Figure 1:
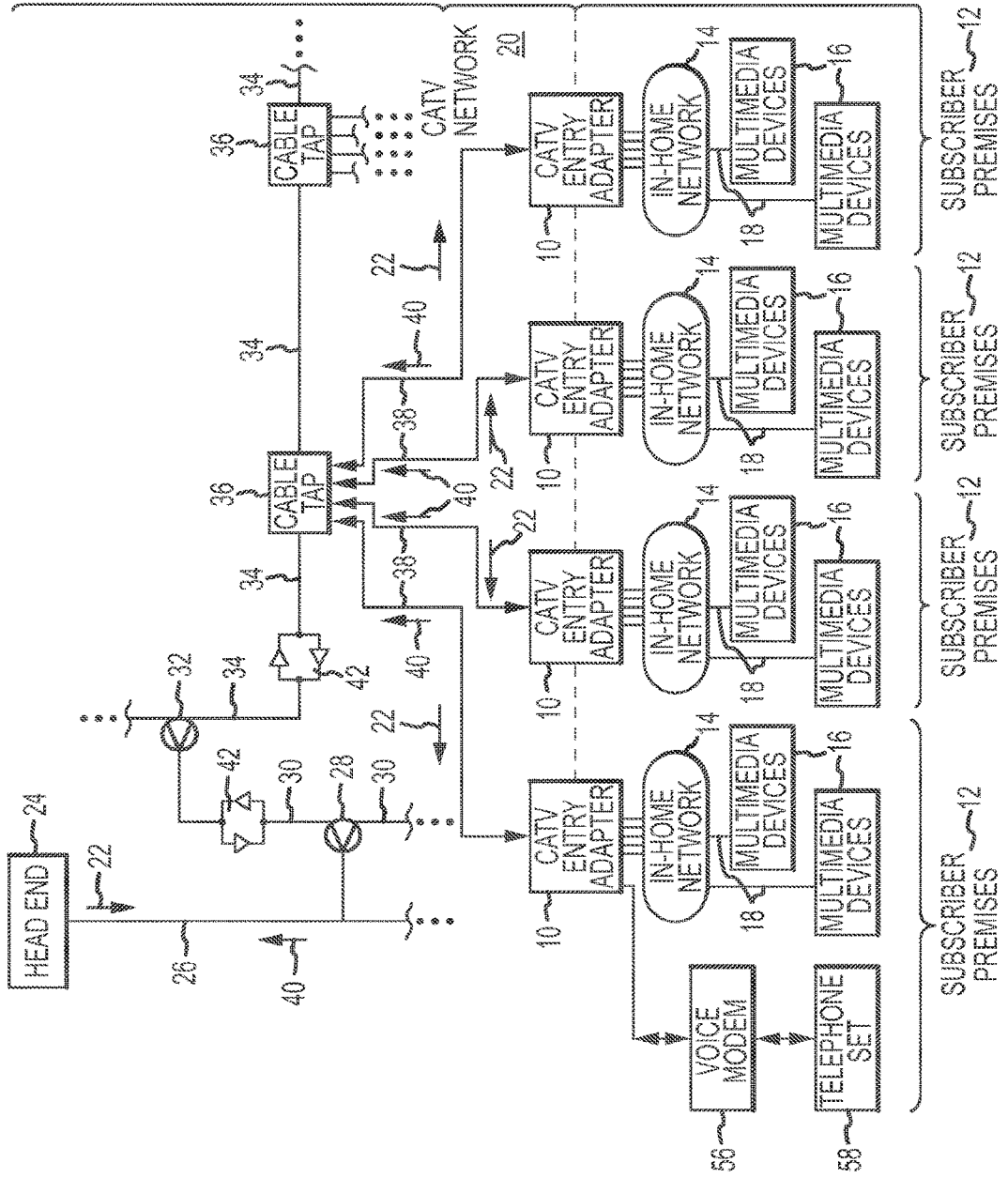
FIG. 1 is a block diagram illustrating a typical CATV network infrastructure, including a plurality of CATV entry adapters which incorporate the present invention, and also illustrating an in-home network using a CATV entry adapter for connecting multimedia devices or other subscriber equipment within the subscriber premises.

A CATV entry adapter 10 which incorporates the present invention is shown generally in FIG. 1. The CATV entry adapter 10 is located at subscriber premises 12 and forms a part of a conventional in-home network 14, such as a conventional Multimedia over Coax Alliance (MoCA) in-home entertainment network. The in-home network 14 interconnects subscriber equipment or multimedia devices 16 within the subscriber premises 12, and allows the multimedia devices 16 to communicate multimedia content or in-home signals between other multimedia devices 16. The connection medium of the in-home network 14 is formed in significant part by a preexisting CATV coaxial cable infrastructure (represented generally by coaxial cables 18) present in the subscriber premises 12 and originally intended to communicate CATV signals between the multimedia or subscriber devices 16. However the connection medium of the in-home network 14 may be intentionally created using newly-installed coaxial cables 18. Examples of multimedia devices 16 are digital video recorders, computers, data modems, computer game playing devices, television sets, television set-top boxes, and other audio and visual entertainment devices.

The CATV entry adapter 10 is also a part of a conventional CATV network 20. The CATV entry adapter 10 delivers CATV multimedia content or signals from the CATV network 20 to subscriber equipment at the subscriber premises 12. The subscriber equipment includes the multimedia devices 16, but may also include other devices which may or may not operate as a part of the in-home network 14 but which are intended to function as a result of connection to the CATV network 20. Examples of subscriber equipment which may not be part of the in-home network 14 are a modem 56 and a connected voice over Internet protocol (VoIP) telephone set 58 and certain other embedded multimedia terminal adapter-(eMTA) compatible devices (not shown).

The CATV entry adapter 10 has beneficial characteristics which allow it to function simultaneously in both the in-home network 14 and in the CATV network 20, thereby benefiting both the in-home network 14 and the CATV network 20. The CATV entry adapter 10 functions as a hub in the in-home network 14, to effectively transfer in-home network signals between the multimedia and subscriber devices 16. The CATV entry adapter 10 also functions in a conventional role as an CATV interface between the CATV network 20 and the subscriber equipment 16 located at the subscriber premises 12, thereby providing CATV service to the subscriber. In addition, the CATV entry adapter 10 securely confines in-home network communications within each subscriber premise and prevents the network signals from entering the CATV network 20 and degrading the strength of the CATV signals conducted by the CATV network 20 four possible recognition by a nearby subscriber.

The CATV network 20 has a typical topology. Downstream signals 22 originate from programming sources at a headend 24 of the CATV network 20, and are conducted to the CATV entry adapter 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 originating from the subscriber equipment 16 and 56/58 are delivered from the CATV entry adapter 10 to the CATV network 20, and are conducted to the headend 24 in the same path but in reverse sequence. Interspersed at appropriate locations within the topology of the CATV network 20 are conventional repeater amplifiers 42, which amplify both the downstream CATV signals 22 and the upstream CATV signals 40. Conventional repeater amplifiers may also be included in the cable taps 36. The cable taps 36 and signal splitter/combiners 28 and 32 divide a single downstream signal into multiple separate downstream signals, and combine multiple upstream signals into a single upstream signal.

Figure 2:
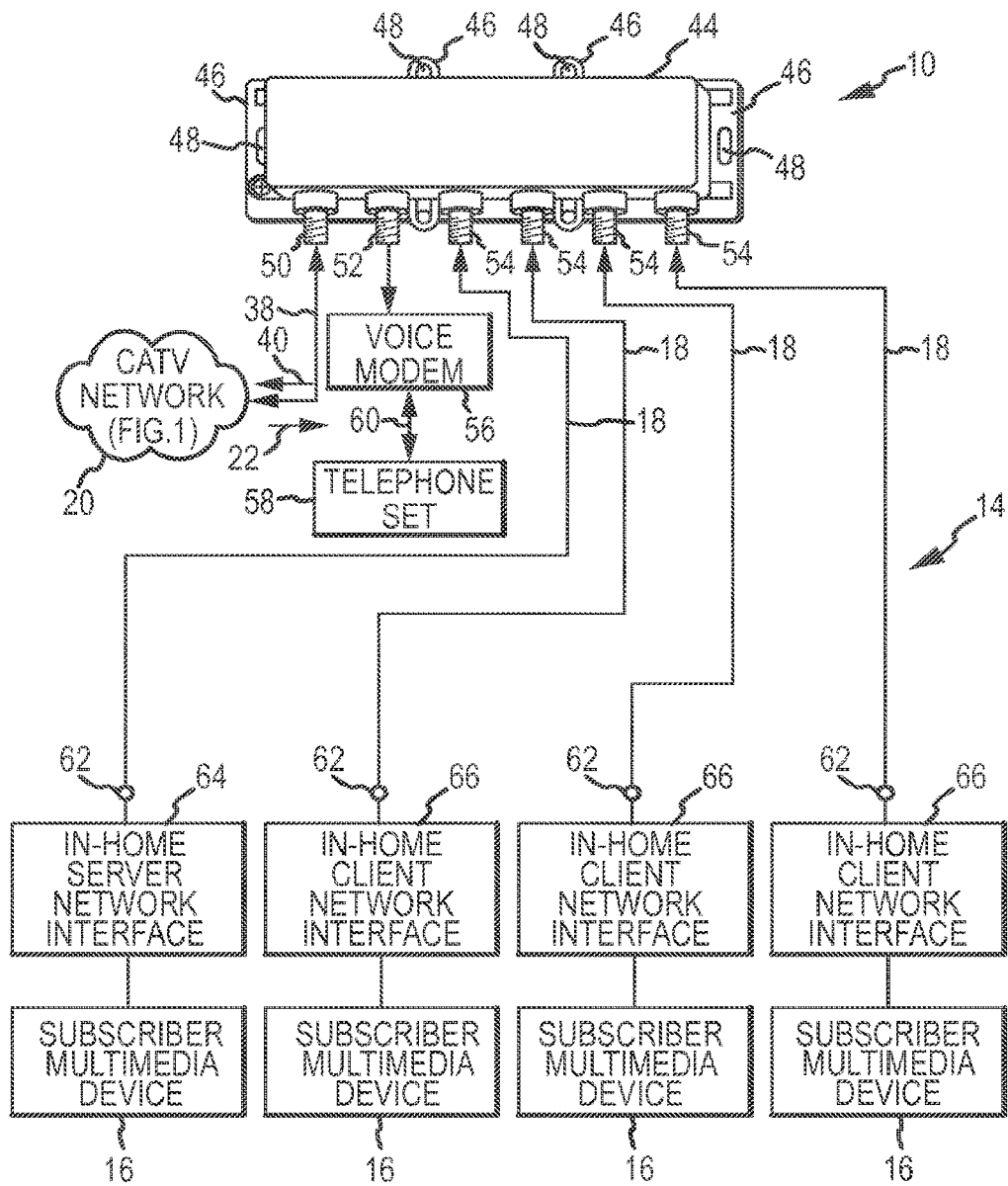
FIG. 2 is a more detailed illustration of the in-home network in one subscriber premises shown in FIG. 1, with more details of network interfaces and subscriber equipment shown in block diagram form.

More details concerning the CATV entry adapter 10 are shown in FIG. 2. The CATV entry adapter 10 includes a housing 44 which encloses internal electronic circuit components (shown in FIGS. 3-8). A mounting flange 46 surrounds the housing 44, and holes 48 in the flange 46 allow attachment of the CATV entry adapter 10 to a support structure at a subscriber premises 12 (FIG. 1).

The CATV entry adapter 10 connects to the CATV network 20 through a CATV connection or entry port 50. The CATV entry adapter 10 receives the downstream signals 22 from, and sends the upstream signals 40 to, the CATV network 20 through the connection port 50. The downstream and upstream signals 22 and 40 are communicated to and from the subscriber equipment through an embedded multimedia terminal adapter (eMTA) port 52 and through in-home network ports 54. A conventional modem 56 is connected between a conventional voice over Internet protocol (VoIP) telephone set 58 and the eMTA port 52. The modem 56 converts downstream CATV signals 22 containing data for the telephone set 58 into signals 60 usable by the telephone set 58 in accordance with the VoIP protocol. Similarly, the modem 56 converts the VoIP protocol signals 60 from the telephone set 58 into Upstream CATV signals 40 which are sent through the eMTA port 52 and the CATV entry port 50 to the CATV network 20.

Coaxial cables 18 within the subscriber premises 12 (FIG. 1) connect the in-home network ports 54 to coaxial outlets 62. The in-home network 14 uses a new or existing coaxial cable infrastructure in the subscriber premises 12 (FIG. 1) to locate the coaxial outlets 62 in different rooms or locations within the subscriber premises 12 (FIG. 1) and to establish the communication medium for the in-home network 14.

In-home network interface devices 64 and 66 are connected to or made a part of the coaxial outlets 62. The devices 64 and 66 send in-home network signals 78 between one another through the coaxial outlets 62, coaxial cables 18, the network ports 54 and the CATV entry adapter 10. The CATV entry adapter 10 internally connects the network ports 54 to transfer the network signals 78 between the ports 54, as shown and discussed below in connection with FIGS. 3-8.

Subscriber or multimedia devices 16 are connected to the in-home network interfaces 64 and 66. In-home network signals 78 originating from a subscriber devices 16 connected to one of the network interfaces 64 or 66 are delivered through the in-home network 14 to the interface 64 or 66 of the recipient subscriber device 16. The network interfaces 64 and 66 perform the typical functions of buffering information, typically in digital form as packets, and delivering and receiving the packets over the in-home network 14 in accordance with the communication protocol used by the in-home network, for example the MoCA protocol. Although the information is typically in digital form, it is communication over the in-home network 14 is typically as analog signals in predetermined frequency bands, such as the D-band frequencies used in the MoCA communication protocol. The combination of one of the in-home network interfaces 64 or 66 and the connected subscriber device 16 constitutes one node of the in-home network 14.

The present invention takes advantage of typical server-client technology and incorporates it within the in-home network interfaces 64 and 66. The in-home network interface 64 is a server network interface, while the in-home network interfaces 66 are client network interfaces. Only one server network interface 64 is present in the in-home network 14, while multiple client network interfaces 66 are typically present in the in-home network 14.

The server network interface 64 receives downstream CATV signals 22 and in-home network signals 68 originating from other client network interfaces 66 connected to subscriber devices 16, extracts the information content carried by the downstream CATV signals 22 and the network signals 78, and stores the information content in digital form on a memory device (not shown) included within the server network interface 64. With respect to downstream CATV signals 22, the server network interface 64 communicates the extracted and stored information to the subscriber device 16 to which that information is destined. Thus the server interface 64 delivers the information derived from the downstream CATV signal 22 to the subscriber device connected to it, or over the in-home network 14 to the client interface 66 connected to the subscriber device 16 to which the downstream CATV signal 22 is destined. The recipient client network interface 66 extracts the information and delivers it to the destined subscriber device connected to that client network interface 66. For network signals 78 originating in one network interface 64 or 66 and destined to another network interlace 64 or 66, those signals are sent directly between the originating and recipient network interfaces 64 or 66, utilizing the communication protocol of the in-home network.

For those signals originating in one of the subscriber devices 16 intended as an upstream CATV signal 40 within the CATV network 20, for example a programming content selection signal originating from a set-top box of a television set, the upstream CATV signal is communicated into the CATV network 20 by the in-home server network interface 64, or is alternatively communicated by the network interface 64 or 66 which is connected to the particular subscriber device 16. In some implementations of the present invention, if the upstream CATV signal originates from a subscriber device 16 connected to a client network interface 66, that client network interface 66 encodes the upstream CATV signal, and sends the encoded signal over the in-home network 14 to the server network interface 64; thereafter, the server network interface 64 communicates the upstream CATV signal through the CATV entry adapter 10 to the CATV network 20. If the upstream signal originates from the subscriber device connected to the server network interface 64, that interface 64 directly communicates the upstream signal through the entry adapter 10 to the CATV network 20.

The advantage of using the server network interface 64 to receive the multimedia content from the downstream CATV signals 22 and then distribute that content in network signals 78 to the client network interfaces 66 for use by the destination subscriber devices 16, is that there is not a substantial degradation in the signal strength of the downstream CATV signal, as would be the case if the downstream CATV signal was split into multiple reduced-power copies and each copy delivered to each subscriber device 16. By splitting downstream CATV signals 22 only a few times, as compared to a relatively large number of times as would be required in a typical in-home network, good CATV signal strength is achieved at the server network interface 64. Multimedia content or other information in downstream CATV signals 22 that are destined for subscriber devices 16 connected to client network interfaces 66 is supplied by the server network interface 64 in network signals 78 which have sufficient strength to ensure good quality of service. Upstream CATV signals generated by the server and client interfaces 64 and 66 are of adequate signal strength since the originating interfaces are capable of delivering signals of adequate signal strength for transmission to the CATV network 20.

Figure 3:
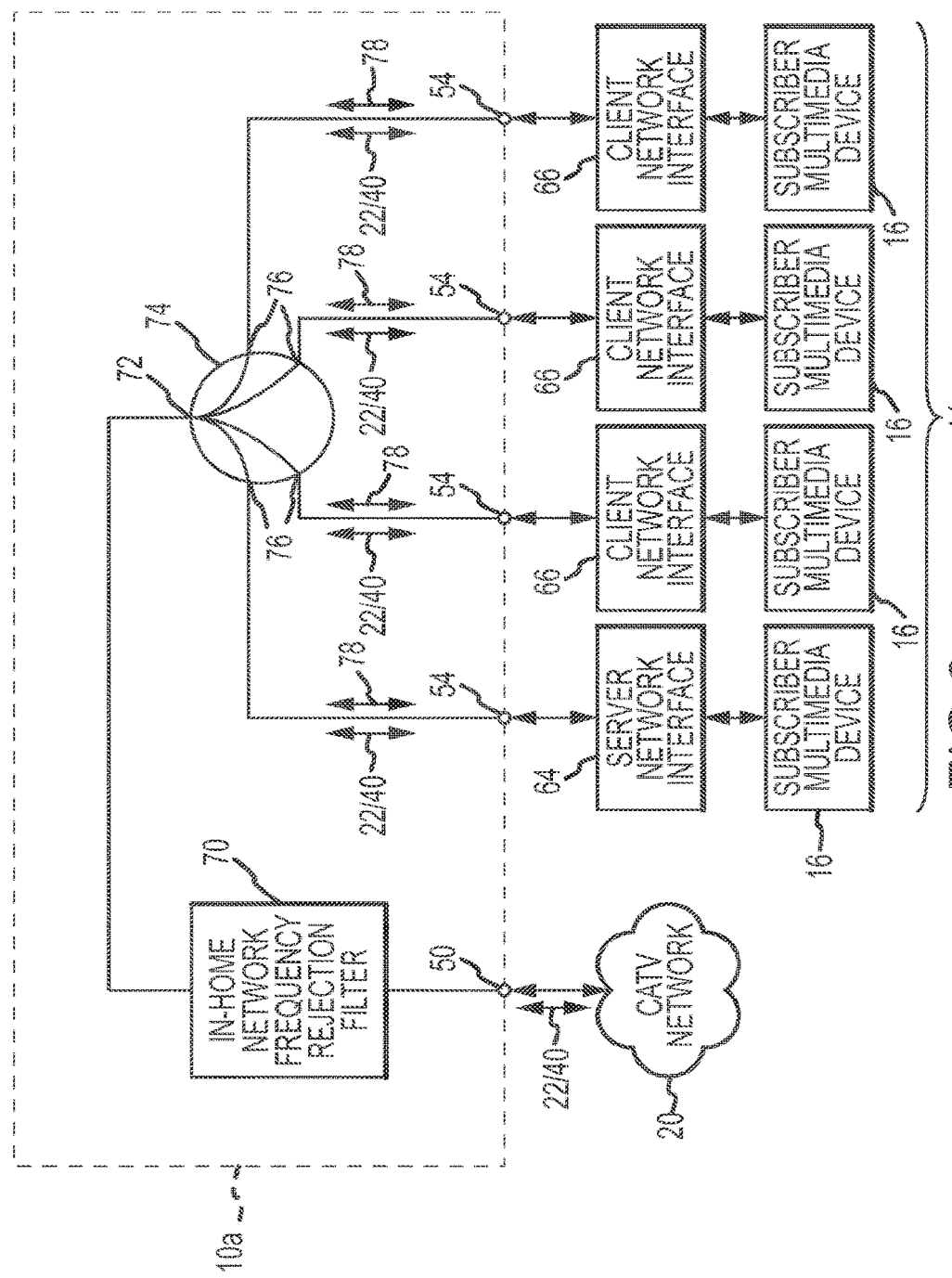
FIG. 3 is a block diagram of components of one embodiment of one CATV entry adapter shown in FIGS. 1 and 2, also showing subscriber and network interfaces in block diagram form.

Different embodiments 10a, 10b, 10c, 10d, 10e and 10f of the CATV entry adapter 10 (FIGS. 1 and 2) are described below in conjunction with FIGS. 3-8, respectively. The CATV entry adapters 10a, 10c and 10e shown respectively in FIGS. 3, 5 and 7 are similar to the corresponding CATV entry adapters 10b, 10d and 10f shown respectively in FIGS. 4, 6 and 8, except for the lack of a dedicated eMTA port 52 and supporting components. In some cases, the eMTA port 52 will not be required or desired.

In the CATV entry adapter 10a shown in FIG. 3, the entry port 50 is connected to the CATV network 20. An in-home network frequency band rejection filter 70 is connected between the entry port 50 and an input terminal 72 of a conventional four-way splitter 74. Four output terminals 76 of the four-way splitter 74 are connected to the in-home network ports 54. Downstream and upstream CATV signals 22 and 40 pass through the filter 70, because the filter 70 only rejects signals with frequencies which are in the in-home network frequency band. The frequency band specific to the in-home network 14 is different from the frequency band of the CATV signals 22 and 40.

Downstream and upstream CATV signals 22 and 40 also pass in both directions through the four-way splitter 74, because the splitter 74 carries signals of all frequencies. The four-way splitter 74, although providing a large degree of isolation between the signals at the output terminals 76, still permits in-home network signals 78 to pass between those output terminals 76. Thus, the four-way splitter 74 splits downstream CATV signals 22 into four copies and delivers the copies to the output terminals 76 connected to the network ports 54, conducts upstream CATV signals 40 from the ports 54 and output terminals 76 to the input terminal 72. The four-way splitter 74 also conducts in-home network signals 78 from one of the output terminals 76 to the other output terminals 76, thereby assuring that all of the network interfaces 64 and 66 are able to communicate with one another using the in-home network communication protocol.

One server network interface 64 is connected to one of the ports 54, while one or more client network interfaces 66 is connected to one or more of the remaining ports 54. Subscriber or multimedia devices 16 are connected to each of the network interfaces 64 and 66. The upstream and downstream CATV signals 40 and 22 pass through the splitter 74 to the interface devices 64 and 66 without modification. Those CATV signals are delivered from the interface devices 64 and 66 to the subscriber equipment 16. The network signals 78 pass to and from the interface devices 64 and 66 through the output terminals 76 of the splitter 74. The network signals 78 are received and sent by the interface devices 64 and 66 in accordance with the communication protocol used by the in-home network 14.

The rejection filter 70 blocks the in-home network signals 78 from reaching the CATV network 20, and thereby confines the network signals 78 to the subscriber equipment 16 within the subscribers premises. Preventing the network signals 78 from entering the CATV network 20 ensures the privacy of the information contained with the network signals 78 and keeps the network signals 78 from creating any adverse affect on the CATV network 20.

The CATV entry adapter 10a allows each of the subscriber devices 16 to directly receive CATV information and signals from the CATV network 20 (FIG. 1). Because the server network interface 64 may store multimedia content received from the CATV network 20, the subscriber devices 16 connected to the client network interfaces 66 may also request the server network interface 64 to store and supply that stored content at a later time. The client network interfaces 66 and the attached subscriber devices 16 request and receive the stored multimedia content from the server network interface 64 over the in-home network 14. In this fashion, the subscriber may choose when to view the stored CATV-obtained multimedia content without having to view that content at the specific time when it was available from the CATV network 20. The in-home network 14 at the subscriber premises 12 permits this flexibility.

Figure 4:
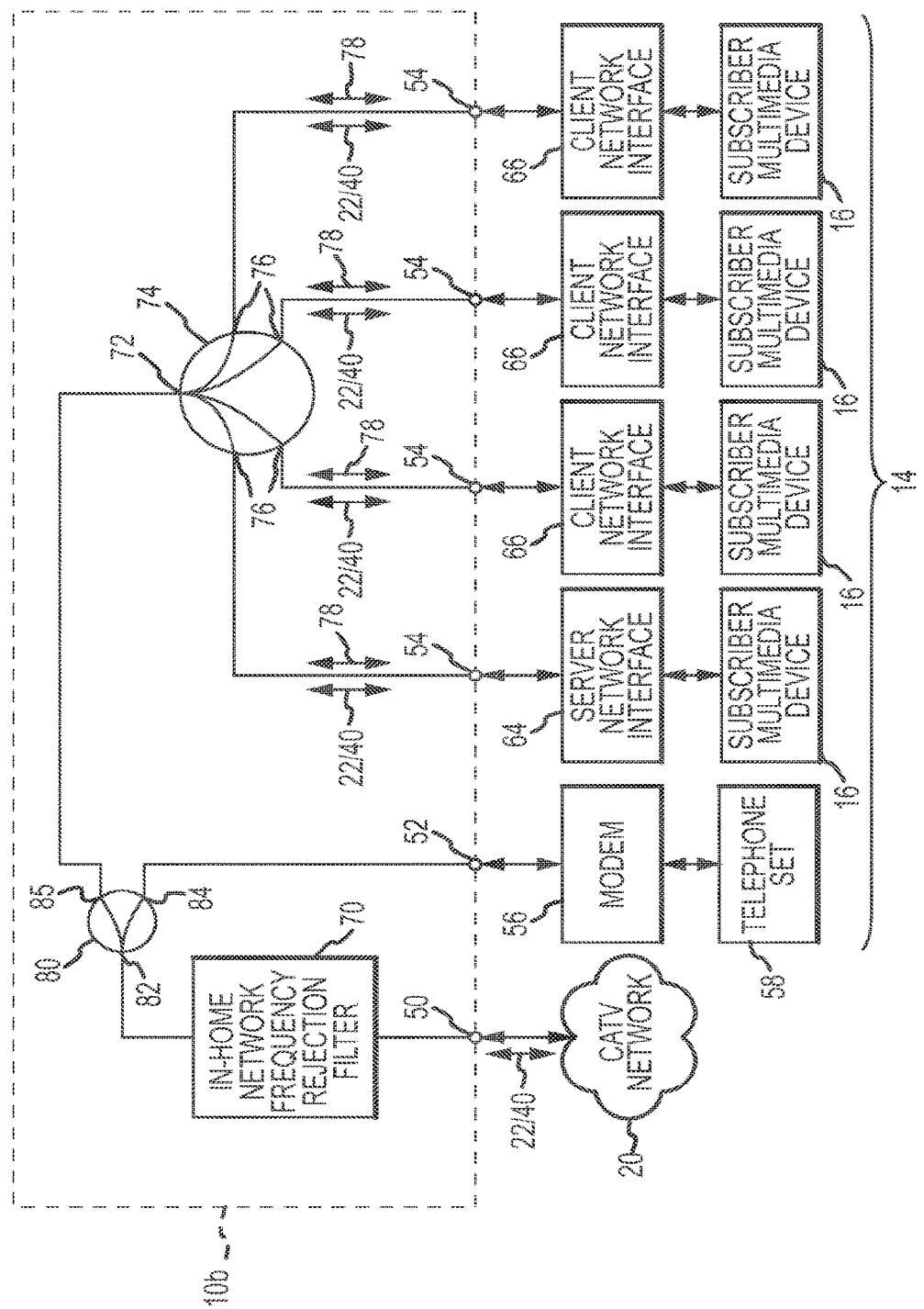
FIG. 4 is a block diagram of components of an alternative embodiment of the CATV entry adapter shown in FIG. 3.
Figure 5:
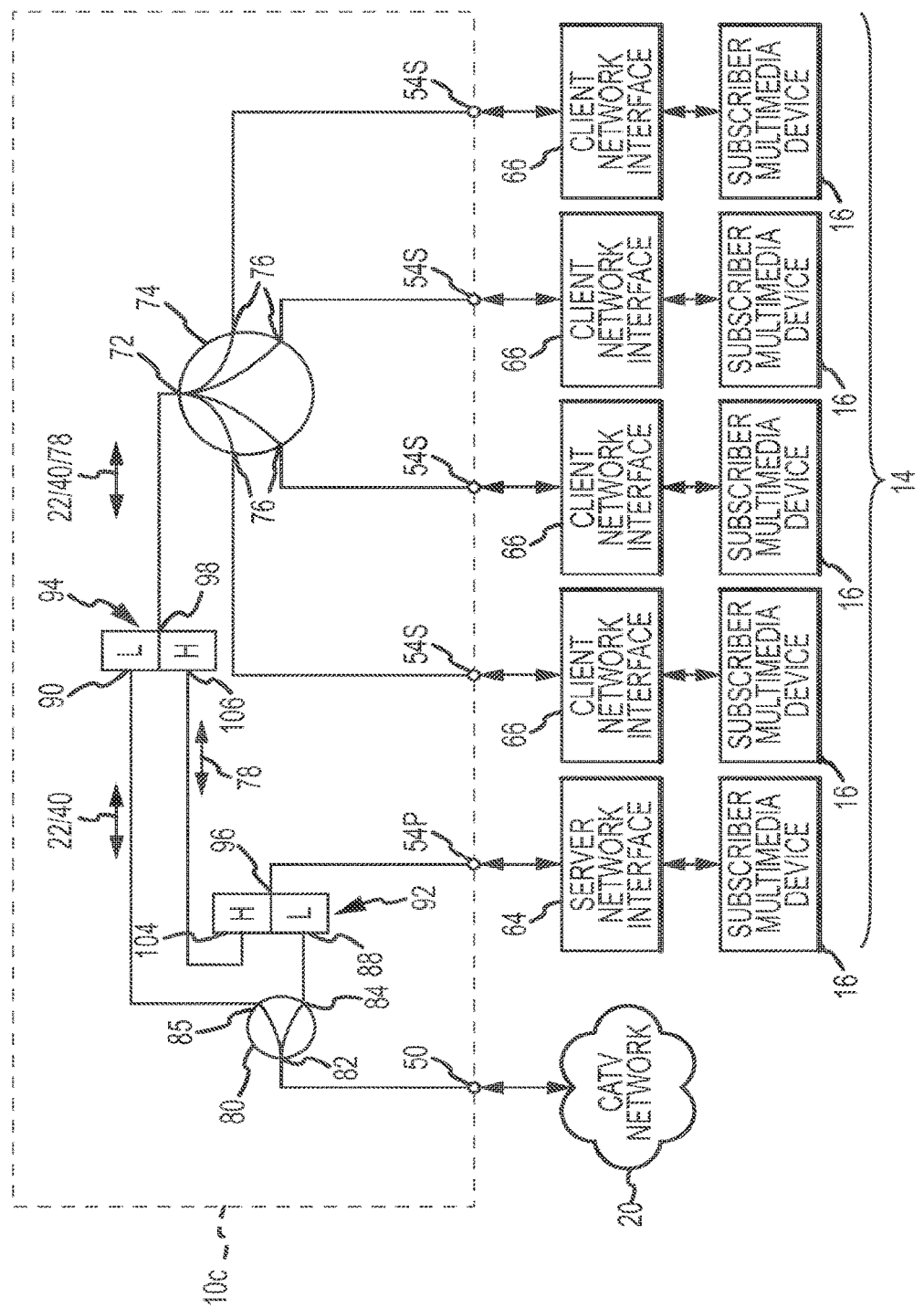
FIG. 5 is a block diagram of components of another embodiment of one CATV entry adapter shown in FIGS. 1 and 2, constituting an alternative embodiment of the CATV entry adapter shown in FIG. 3, also showing subscriber and network interfaces in block diagram form.

The CATV entry adapter 10b shown in FIG. 4 contains the same components described above for the adapter 10a (FIG. 3), and additionally includes an eMTA port 52 and a conventional two-way splitter 80. The modem 56 and VoIP telephone set 58 are connected to the eMTA port 52, for example. An input terminal 82 of the two-way splitter 80 connects to the in-home network rejection filter 70. Output terminals 84 and 85 of the two-way splitter 80 connect to the eMTA port 52 and to the input terminal 72 of the four-way splitter 74, respectively.

The downstream CATV signals 22 entering the two-way splitter are split into two reduced-power copies and delivered to the output ports 84 and 85. The split copies of the downstream CATV signals 22 are approximately half of the signal strength of the downstream CATV signal 22 delivered from the CATV network 20 to the entry port 50. Consequently, the copy of the downstream CATV signal 22 supplied to the eMTA port 52 has a relatively high signal strength, which assures good operation of the modem 56 and VoIP telephone set 58. Adequate operation of the modem 56 in the telephone set 58 is particularly important in those circumstances where "life-line" telephone services are provided to the subscriber, because a good quality signal assures continued adequate operation of those services. In the situation where the downstream CATV signal 22 is split multiple times before being delivered to a modem or VoIP telephone set, the multiple split may so substantially reduce the power of the downstream CATV signal 22 supplied to the modem and VoIP telephone set that the ability to communicate is substantially compromised.

A benefit of the adapter 10b over the adapter 10a (FIG. 3) is the single, two-way split of the downstream CATV signal 22 and the delivery of one of those copies at a relatively high or good signal strength to the dedicated eMTA port 52. A disadvantage of the adapter 10b over the adapter 10a (FIG. 4) is that the downstream CATV signals 22 pass through an extra splitter (the two-way splitter 80) prior to reaching the subscriber devices 16, thereby diminishing the quality of the downstream signal 22 applied from the network ports 54 to the subscriber devices 16. The downstream CATV signals 22 utilized by the subscriber devices 16 are diminished in strength, because the four-way split from the splitter 74 substantially reduces the already-reduced power, thus reducing the amount of signal strength received by the subscriber devices 16. However, the functionality of the subscriber devices 16 is not as critical or important as the functionality of the modem 56 and telephone 58 or other subscriber equipment connected to the eMTA port 52.

Upstream CATV signals 40 from the subscriber devices 16 and the voice modem 56 are combined by the splitters 74 and 80 and then sent to the CATV network 20 through the in-home network frequency band rejection filter 70, without substantial reduction in signal strength due to the relatively high strength of those upstream CATV signals 40 supplied by the network interfaces 64 and 66 and the modem 56 or other subscriber equipment 16.

The embodiment of the CATV entry adapter 10c shown in FIG. 5 eliminates the need for the in-home network frequency band rejection filter 70 (FIGS. 3 and 4), while preserving the ability to block the in-home network frequency band signals 78 from entering the CATV network 20 and while assuring that a relatively high strength downstream CATV signal 22 will be present for delivery to subscriber equipment at one or more network ports. To do so, the CATV entry adapter 10c uses two conventional diplexers 92 and 94 in conjunction with the splitter 74 and 80. In general, the function of a conventional diplexer is to separate signals received at a common terminal into signals within a high frequency range and within a low frequency range, and to deliver signals in the high and low frequency ranges separately from high and low pass terminals. Conversely, the conventional diplexer will combine separate high frequency and low frequency signals received separately at the high and low frequency terminals into a single signal which has both high frequency and low frequency content and supply that single signal of combined frequency content at the common terminal.

In the following discussion of the CATV entry adapters which utilize diplexers, the predetermined low frequency range is the CATV signal frequency range which encompasses both the upstream and downstream CATV signals 22 and 40 (i.e., 5-1002 MHz), and the predetermined high frequency range is the frequency of the in-home network signals 78. When in-home network 14 is implemented by use of MoCA devices and protocol, the in-home frequency band is greater than the frequency band employed for CATV signals (i.e., 1125-1525 MHz). If the in-home network 14 is implemented using other networking technology, the network signals 78 must be in a frequency band which is separate from the frequency band of the upstream and downstream CATV signals. In such a circumstance, the high and low frequency ranges of the diplexers used in the herein-described CATV entry adapters must be selected to separate the CATV signal frequency band from the in-home network signal frequency band.

The entry port 50 connects the adapter 10c to the CATV network 20. A two-way splitter 80 has an input terminal 82 which is connected directly to the entry port 50. The two-way splitter 80 splits the downstream CATV signals 22 at the input terminal 82 into two identical copies of reduced signal strength and conducts those copies through the two output terminals 84 and 85. The split copy of the downstream CATV signal 22 supplied by the output terminal 84 is conducted to a principal network port 54p of the entry adapter 10c. The network port 54p is regarded as a principal network port because the server network interface 64 is connected to that port 54p. A subscriber devices 16 may or may not be connected to the server network interface 64.

The two output terminals 84 and 85 of the splitter 80 are respectively connected to low-pass terminals 88 and 90 of conventional diplexers 92 and 94. The low pass terminals 88 and 90 of the diplexers 92 and 94 receive and deliver signals which have a predetermined low frequency range. High pass terminals 104 and 106 of the diplexers 92 and 94 receive and deliver signals which have a predetermined high frequency range. Common terminals 96 and 98 of the diplexers 92 and 94 receive and deliver signals that have both predetermined high and predetermined low frequency ranges.

The common terminal 98 of the diplexer 94 is connected to the input terminal 72 of the four-way splitter 74. The output terminals 76 of the four-way splitter 74 are connected to the in-home network ports 54 (FIG. 2) which are designated as secondary ports 54s. Client network interfaces 66 are connected to the secondary ports 54s. Subscriber devices 16 are connected to the client interfaces 66. The network ports 54s to which the client network interfaces 66 are connected are designated as secondary network ports because the server network interface 64 is connected to the principal network port 54p.

The high-pass terminals 104 and 106 of the diplexers 92 and 94 are connected to each other. As a consequence, the higher frequency band of the network signals 78 are conducted by the diplexers 92 and 94 through their high pass terminals 104 and 106 and between their common terminals 96 and 98. In this manner, the network signals 78 are confined for transmission only between the network interfaces 64 and 66, through the diplexers 92 and 94 and the four-way splitter 74.

The diplexers 92 and 94 also conduct the lower frequency band CATV signals 22 and 40 from their common terminals 96 and 98 through their low-pass terminals 88 and 90 to the principal port 54p and to the input terminal 72 of the four-way splitter 74. The four-way splitter 74 conducts the lower frequency band CATV signals 22 and 40 to the secondary ports 54s. The CATV signals 22 and 40 are available to all of the network interfaces 64 and 66 and to the subscriber equipment 16 connected to those network interfaces 64 and 66. In this manner, the CATV signals 22 and 40 and the network signals 78 are both made available to each of the network interfaces 64 and 66 so that each of the subscriber devices 16 has the capability of interacting with both the CATV signals and the network signals. The frequency band separation characteristics of the diplexers 92 and 94 perform the function of preventing the high frequency network signals 78 from reaching the CATV network 20.

Another advantage of the CATV entry adapter 10c is that the downstream CATV signals 22 are applied to the server network interface 64 and its attached subscriber device 16 with only the relatively small reduction in signal strength caused by splitting the downstream CATV signal 22 in the two-way splitter 80. This contrasts with the substantially greater reduction in signal strength created by passing the downstream CATV signal 22 through the four-way splitter 74 in the entry adapters 10a and 10b (FIGS. 3 and 4) to reach the subscriber devices 16. Minimizing the amount of signal power reduction experienced by the downstream CATV signal 22 received by the server network interface 64 preserves a high quality of the multimedia content contained in the downstream CATV signal 22. Consequently, the server network interface 64 receives high quality, good strength downstream CATV signals, which the server network interface 64 uses to supply high quality of service by sending that content in network signals 78 to the client network interfaces 66 connected to other subscriber devices. In this manner, the CATV entry adapter 10c may be used to replace the downstream CATV signals directly applied to the client network interfaces with the network signals containing the same content.

Another advantage of the CATV entry adapter 10c is that the server network interface 64 can store the multimedia content obtained from the downstream CATV signal supplied to it. A subscriber may wish to access and view or otherwise use that stored multimedia content at a later time. The stored multimedia content is delivered in high quality network signals 78 to the client network interfaces 66 over the in-home network 14. Because of the capability of the server network interface 64 to supply high quality network signals, the reduction in signal strength created by the four-way splitter 74 does not significantly impact the quality of the network signals received by the client network interfaces 66. Thus, the CATV entry adapter 10c offers a subscriber the opportunity to utilize directly those CATV signal copies which pass through the four-way splitter 74, or to achieve a higher quality signal when the server network interface 64 converts the content from the downstream CATV signal into network signals 78 which are then made available as high-quality network signals for the client network interfaces 66.

Storing the multimedia content obtained from the downstream CATV signals 22 in the storage medium of the server network interface 64 provides an opportunity for one or more of the client network interfaces 66 to access that stored content and request its transmission over the in-home network 14 to the subscriber devices 16 connected to the requesting client network interface 66. Because the multimedia content has been stored by the server network interface 64, the client network interfaces 66 may request and receive that multimedia content at any subsequent time while that content remains stored on the server network interface 64.

Figure 6:
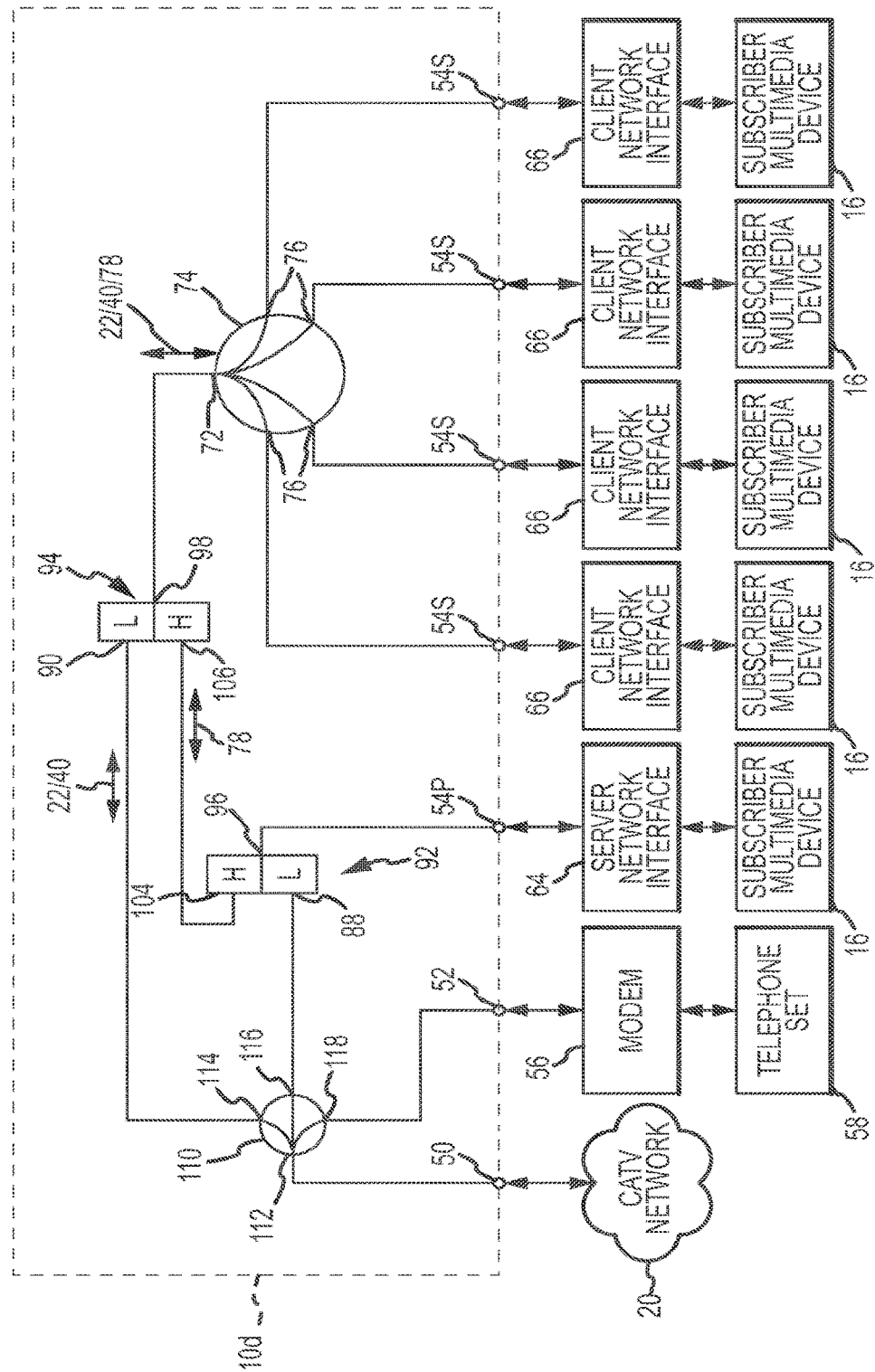
FIG. 6 is a block diagram of components of an alternative embodiment of the CATV entry adapter shown in FIG. 5.
Figure 7:
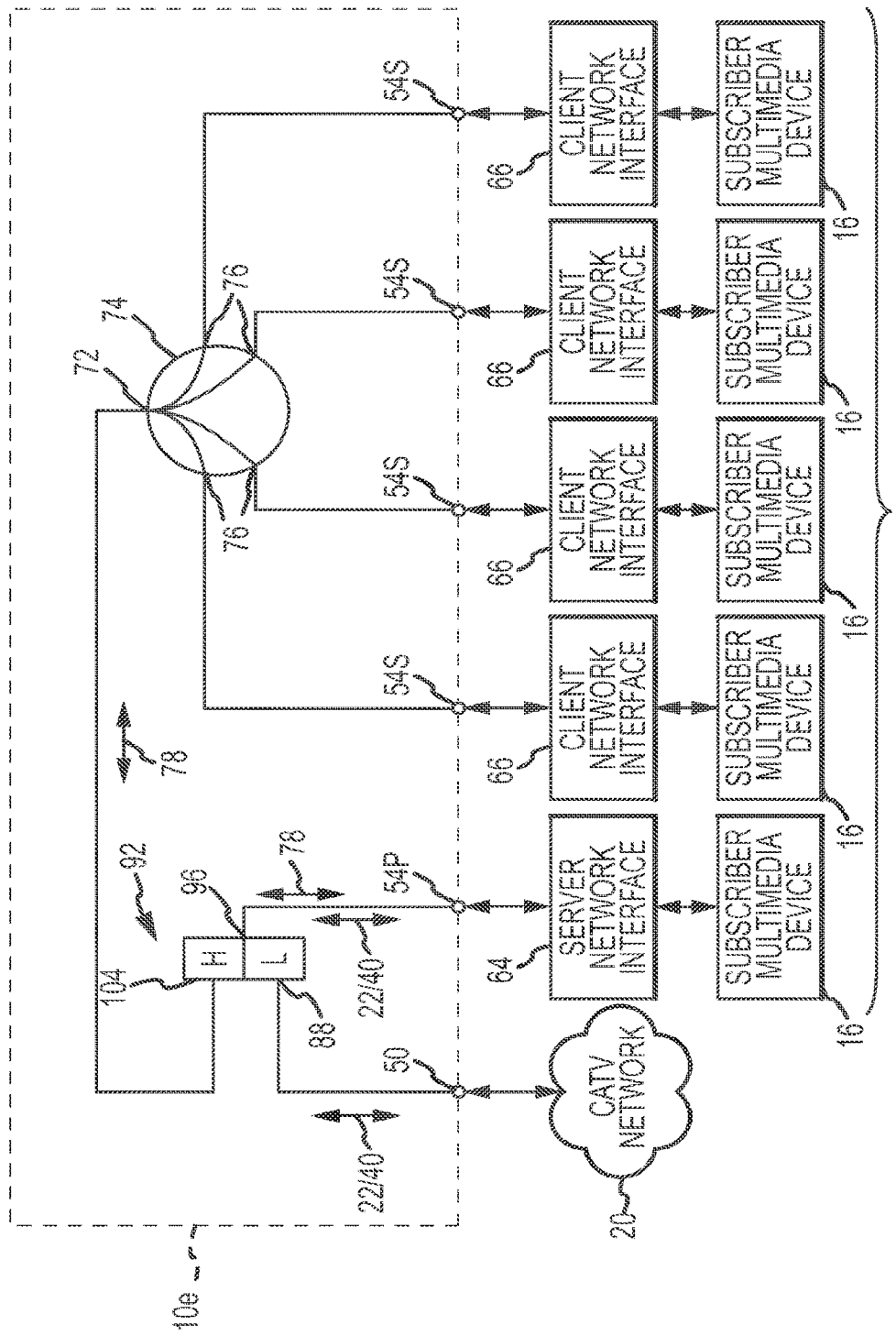
FIG. 7 is a block diagram of components of another embodiment of one CATV entry adapter shown in FIGS. 1 and 2, constituting an alternative embodiment of the CATV entry adapters shown in FIGS. 3 and 5, also showing subscriber and network interfaces in block diagram form.

The CATV entry adapter 10d shown in FIG. 6 is similar to the CATV entry adapter 10c (FIG. 5) except that the adapter 10d allows a modem 56 and VoIP telephone set 58 to be connected in a dedicated manner that does not involve use of the in-home network 14. If a modem and VoIP telephone set are connected to the CATV entry adapter 10c (FIG. 5), the modem and VoIP telephone set would be connected as subscriber equipment to the server network interface 64 in that entry adapter 10c. In this circumstance, the proper functionality of the modem and VoIP telephone set depends on proper functionality of the server network interface 64, and that functionality is susceptible to failure due to power outages and the like.

In the CATV entry adapter 10d shown in FIG. 6, a three-way splitter 110 is used to divide the downstream CATV signal 22 into three reduced-power identical copies. The three-way splitter has a single input terminal 112 and three output terminals 114, 116 and 118. The input terminal 112 is connected to the entry port 50, and two of the output terminals 114 and 116 are connected to the low pass terminals 88 and 90 of the diplexers 92 and 94. A third output terminal 118 is connected to the eMTA port 52. Although the signal strength of the CATV signal 22 is diminished as a result of the three-way split in the splitter 110, there will be sufficient strength in the copy supplied to the EMTA port 52 from the output terminal 118 to permit the modem 56 and VoIP telephone set 58 to operate reliably. Upstream signals from the modem 56 and the VoIP telephone set 58 pass through the three-way splitter 110 into the CATV network 20.

The advantage to the CATV entry adapter 10d is that the functionality of the modem 56 and the VoIP telephone set 58 does not depend on the functionality of the network interfaces 64 and 66. Thus any adversity which occurs within the in-home network 14 does not adversely influence the capability of the modem 56 and the VoIP telephone to provide continuous telephone service to the subscriber. Continuous telephone service is important when the service is "life-line" telephone service. Other communication with respect to downstream and upstream CATV signals 22 and 40 and network signals 78 occur in the manner discussed above in conjunction with the adapter 10c (FIG. 5).

The CATV entry adapter 10e, shown in FIG. 7, is distinguished from the previously discussed CATV entry adapters 10a, 10b, 10c and 10d (FIGS. 3-6) by conducting only the CATV signals 22 and 40 between the entry port 50 and the principal port 54p to which the server network interface 64 is connected. In the CATV entry adapter 10e, the entry port 50 is connected to the low pass terminal 88 of the diplexer 92. The common terminal 96 of the diplexer 92 is connected to the principal port 54p. The high pass terminal 104 of the diplexer 92 is connected to the input terminal 72 of the four-way splitter 74. Output terminals 76 of the four-way splitter 74 are connected to the secondary ports 54s. The principal and secondary ports 54p and 54s are connected to the server and client network interfaces 64 and 66.

In the CATV entry adapter 10e, the downstream CATV signals 22 are not conducted to the client network interfaces 66. Similarly, the upstream CATV signals 22 are not conducted from the client network interfaces 66 to the entry port 50. Instead, all CATV signals 22 and 40 are conducted through the low pass terminal 88 of the diplexer 92. The server network interface 64 converts the multimedia content from the downstream CATV signals 22 into network signals 78 to the client network interfaces 66, and all of the information constituting upstream CATV signals 40 is communicated as network signals 78 from the client network interfaces 66 to the server network interface 64. The server network interface 64 converts the information into upstream CATV signals 40 and delivers them to the common terminal 96 of the diplexer 92.

A subscriber device connected to a client network interface 66 that wishes to request content from the CATV network 20 sends a signal over the in-home network 14 to the server network interface 64, and the server network interface 64 sends the appropriate upstream CATV signal 40 to the CATV network 20. The CATV network 20 responds by sending downstream CATV signals 22, which are directed through the diplexer 92 only to the server network interface 64. Multimedia content obtained from the downstream CATV signals 22 is received and stored by the server network interface 64. The storage of the multimedia content on the server network interface 64 may be for a prolonged amount of time, or the storage may be only momentary. The server network interface 64 processes the content of the downstream CATV signals 22 into network signals 78 and delivers those signals over the in-home network 14 to the requesting client network interface 66 for use by its attached subscriber device 16. Even though the network signals 78 sent by the server network interface 64 pass through the four-way splitter 74, the strength of the signals supplied by the server network interface 64 is sufficient to maintain good signal strength of the network signals 78 when received by the client network interfaces 66.

The advantage of the CATV entry adapter 10e over the other adapters 10a, 10b, 10c and 10d (FIGS. 3-6) is that the downstream CATV signal 22 reaches the server network interface 64 with substantially no reduction in signal strength. The downstream CATV signal 22 is conducted between the entry port 50 and the principal port 54p without being split. The high strength of the downstream CATV signal 22 is therefore available for use in obtaining the multimedia content from the downstream CATV signal 22. The multimedia content is also maintained at a high quality when transferred from the server network interface 64 to the client network interfaces 66, since the server network interface 64 delivers a high quality network signal 78 to the client network interfaces 66 over the in-home network 14, even when the network signals 78 are passed through the four-way splitter 74.

The CATV entry adapter 10e therefore achieves the highest possible signal strength and quality for a passive CATV entry adapter, and enables multimedia content received from the downstream CATV signals 22 to be shared to multiple subscriber devices 16 over the in-home network. The passive nature of the CATV entry adapter 10e improves its reliability. The relatively small number of internal components, i.e. one diplexer 92 and one four-way splitter 74, also reduces the cost of the adapter 10e.

Figure 8:
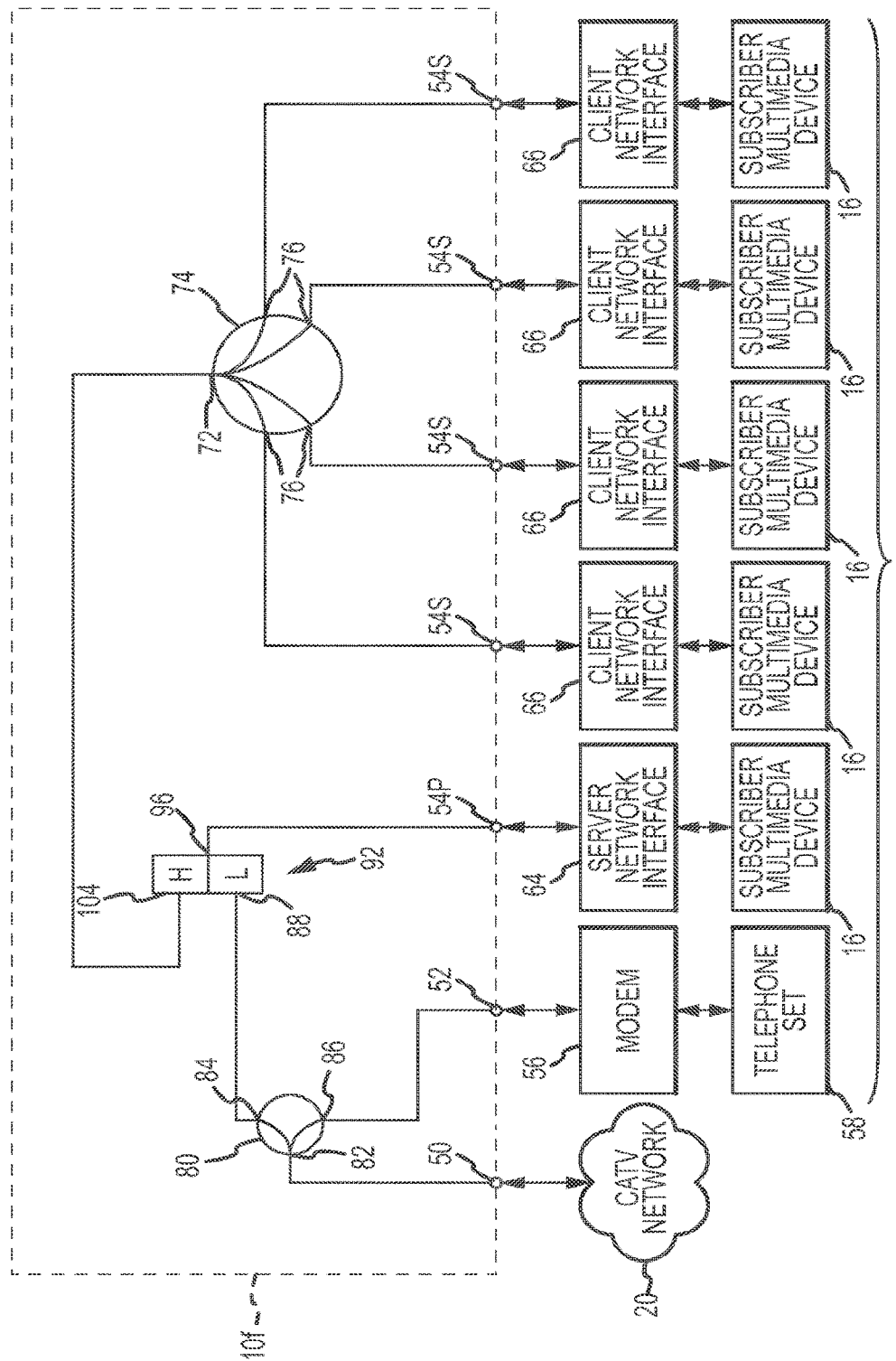
FIG. 8 is a block diagram of components of an alternative embodiment of the CATV entry adapter shown in FIG. 7.

A CATV entry adapter 10f shown in FIG. 8 uses an additional two-way splitter 80 and has a eMTA port 52 for connecting the modem 56 and the VoIP telephone set 58, compared to the components of the entry adapter 10e (FIG. 7). The input terminal 82 of the two-way splitter 80 connects to the entry port 50. The output terminal 84 of the splitter 80 connects to the eMTA port 52, and the other output terminal 85 of the splitter 80 connects to the low-pass terminal 88 of the diplexer 92.

The downstream and upstream CATV signals 22 and 40 are conducted between the entry port 50 and both the eMTA port 52 and the principal port 54p. Copies of the downstream CATV signal 22 reach both the eMTA port 52 and the principal port 54p after having been split only once by the two-way splitter 80. The downstream CATV signals 22 reaching both the eMTA port 52 and the principal port 54p have a relatively high signal strength, since only one split of the downstream CATV signal 22 has occurred. Consequently, the entry adapter 10f delivers high quality downstream CATV signals 22 to both the modem 56 and connected VOIP telephone set 58 and to the server network interface 64.

The advantage to the CATV entry adapter 10f is that it provides reliable telephone service through the eMTA port 52, which is not dependent upon the functionality of the network interfaces 64 and 66. Accordingly, reliable telephone service is available. In addition, the entry adapter 10f reliably communicates the content of the downstream CATV signals 22, because the single signal split from the splitter 80 does not diminish the quality of the downstream CATV signal 22 sufficiently to adversely affect the performance of the server network interface 64 in obtaining the CATV content. That high-quality content is preserved when it is communicated as network signals 78 from the server network interface 64 to the client interface devices 66 which are connected to the subscriber devices 16. Other than a slight reduction in signal strength created by the splitter 80, the communication of the downstream CATV signals 22 containing multimedia content for the subscriber devices 16 is essentially the same as that described in connection with the CATV entry adapter 10e (FIG. 7).

The CATV entry adapters described within offer numerous advantages over other presently-known CATV entry adapters. Each of the CATV entry adapters is capable of supplying multimedia content from the CATV network to any of the subscriber devices connected to the adapter, either through direct communication of the downstream CATV signal 22 or by use of the network signals 78. Each of the CATV entry adapters also functions as a hub for the in-home network 14. Each of the CATV entry adapters is constructed with passive components and therefore do not require an external power supply beyond the CATV signals 22 and 40 and the network signals 78, thus both improving the reliability of the adapters themselves and reducing service calls. Each CATV entry adapter achieves a substantial strength of the downstream CATV signal 22 by limiting the number of times that the downstream signal 22 is split, compared to conventional CATV entry adapters which require a signal split for each subscriber device in the premises. Critical communications over the CATV network, such as life-line phone service, is preserved by CATV signals communicated over the CATV network to ensure such critical communications are not adversely affected by multiple splits of the CATV signal. The CATV entry adapter also minimizes the risks of malfunction or failure for which the CATV service provider is responsible.

These and other benefits and advantages will become more apparent upon gaining a complete appreciation for the improvements of the present invention. Preferred embodiments of the invention and many of its improvements have been described with a degree of particularity. The description is of preferred examples for implementing the invention, and these preferred descriptions are not intended necessarily to limit the scope of the invention. The scope of the invention is defined by the following claims.

The invention claimed is:

1. An entry adapter for controlling upstream and downstream communications between a cable television (CATV) network and a client multimedia over coaxial alliance (MoCA) network, without diminishing downstream CATV signal strength within the client MoCA network to an extent that disrupts CATV signal communications within the client MoCA network, comprising:
 a plurality of ports configured to allow downstream and upstream CATV signals to be distributed between a CATV network and a client MoCA network, wherein the plurality of network ports comprises an entry port configured to communicate with the CATV network, a primary network port, and secondary network ports;
 two-way, high/low frequency band isolation and limited distribution means for allowing downstream and upstream CATV network signals to communicate with the primary port, blocking client network signals from being communicated upstream to the CATV network, and splitting a MoCA network signal into a plurality of reduced signal-strength network signal copies to be communicated to the secondary ports;
 wherein the two-way, high/low frequency band isolation and limited distribution means is configured to isolate network signals into a high frequency band range and a low frequency band range so as to allow downstream and upstream low frequency band CATV network signals to communicate with the primary port while blocking high frequency band client network signals from being communicated upstream to the CATV network, and while communicating the high frequency band client network signals between the primary port and the secondary ports;
 wherein the two-way, high/low frequency band isolation and limited distribution means is configured to transmit the downstream CATV signal to the primary port without splitting the downstream CATV signal more than once between the entry port and the primary port, so as to prevent disruption of signal communication between the CATV network and the client MoCA network;
 wherein the client MoCA network signals are in the high frequency band range, and not in the low frequency band range;
 wherein the downstream and upstream CATV network signals are in the low frequency band range, and not in the high frequency band range; and
 wherein the entry adapter is configured to permit a plurality of client MoCA devices to communicate with each other to deliver multimedia content using a MoCA communication protocol over the client MoCA network.

2. The adapter of claim 1, wherein the client MoCA network comprises an in-home network.

3. The adapter of claim 1, wherein at least one of the client MoCA devices comprises a subscriber device.

4. The adapter of claim 1, wherein the primary network port is configured to communicate with a server network interface, and the secondary network ports are each configured to communicate with a client MoCA network interface.

5. The adapter of claim 4, wherein the two-way, high/low frequency band isolation and limited distribution means comprises a signal splitter that is configured to allow a first reduced signal-strength network signal copy to be communicated to the primary network port and allow a second reduced signal-strength network signal copy to be communicated to the secondary network ports.

6. The adapter of claim 1, wherein the two-way, high/low frequency band isolation and limited distribution means comprises a signal splitter that has a splitter input terminal, a first splitter output terminal, and a second splitter output terminal.

7. The adapter of claim 6, wherein the signal splitter is configured to split a CATV signal into a first network signal copy and a second network signal copy, communicate the first network signal copy to the primary network port, and communicate the second network signal copy to the secondary network ports.

8. The adapter of claim 1, wherein the two-way, high/low frequency band isolation and limited distribution means comprises a diplexer.

9. The adapter of claim 8, wherein the diplexer comprises a first diplexer and a second diplexer.

10. The adapter of claim 9, wherein the first diplexer includes a first high frequency band terminal, a first low frequency band terminal, and a first common terminal.

11. The adapter of claim 10, wherein the two-way, high/low frequency band isolation and limited distribution means comprises a signal splitter, the first low frequency band terminal is configured to communicate with a first splitter output terminal of the signal splitter, and the first common terminal is configured to communicate with the primary network port.

12. The adapter of claim 10, wherein the first diplexer is configured to only communicate network signals in a predetermined high frequency band range through the first high frequency band terminal, and only communicate network signals in a predetermined low frequency band range through the first low frequency band terminal.

13. The adapter of claim 10, wherein the second diplexer includes a second high frequency band terminal, a second low frequency band terminal, and a second common terminal.

14. The adapter of claim 13, wherein the two-way, high/low frequency band isolation and limited distribution means comprises a signal splitter, the second high frequency band terminal is configured to communicate with the first high frequency band terminal of the first diplexer, the second low frequency band terminal is configured to communicate with a second splitter output terminal of the signal splitter, and the second common terminal is configured to communicate with the secondary network port.

15. The adapter of claim 13, wherein the second diplexer is configured to only communicate network signals in a predetermined high frequency band range through the second high frequency band terminal, and only communicate network signals in a predetermined low frequency band range through the second low frequency band terminal.

16. The adapter of claim 1, wherein the two-way, high/low frequency band isolation and limited distribution means comprises a first diplexer having a first high frequency band terminal and a second diplexer having a second high frequency band terminal, and the first high frequency band terminal of the first diplexer is configured to isolate and communicate high frequency band signals with the second high frequency band terminal of the second diplexer.

17. The adapter of claim 1, wherein the two-way, high/low frequency band isolation and limited distribution means comprises one or more passive electrical components.

18. The adapter of claim 1, wherein power received by the adapter is received only through the downstream and upstream CATV signals and the client MoCA network signals.

19. The adapter of claim 1, wherein the downstream and upstream CATV signals are distributed through the two-way, high/low frequency band isolation and limited distribution means without being attenuated.

20. The adapter of claim 1, wherein the two-way, high/low frequency band isolation and limited distribution means comprises a diplexer having a first common terminal and a second common terminal, wherein the primary network port is configured to communicate with the first common terminal of the diplexer and the secondary network ports are configured to communicate with the second common terminal of the diplexer.

21. The adapter of claim 1, wherein the two-way, high/low frequency band isolation and limited distribution means comprises a first diplexer having a first common terminal, and a second diplexer having a second common terminal, the primary network port being configured to communicate with the first common terminal of the first diplexer, and the secondary network port being configured to communicate with the second common terminal of the second diplexer.

22. The adapter of claim 1, wherein the two-way, high/low frequency band isolation and limited distribution means comprises a first signal splitter, and further comprising a second signal splitter.

23. The adapter of claim 22, wherein the first signal splitter comprises a two-way splitter.

24. The adapter of claim 22, wherein the second signal splitter comprises a four-way splitter.

25. The adapter of claim 22, wherein the second signal splitter comprises a second splitter input terminal and a second splitter output terminal.

26. The adapter of claim 22, wherein the second signal splitter comprises a second splitter input terminal and a plurality of second splitter output terminals.

27. The adapter of claim 1, wherein the client MoCA device comprises a plurality of client devices each configured to communicate with a separate one of the secondary network ports.

28. The adapter of claim 27, wherein the two-way, high/low frequency band isolation and limited distribution means comprises a first signal splitter, and further comprising a second signal splitter configured to split a network signal into a plurality of network signal copies, and communicate the plurality of network signal copies to the secondary network ports.

29. The adapter of claim 1, wherein the entry port is configured to be in direct communication with the CATV network.

30. The adapter of claim 1, wherein the entry port is configured to be directly connected to the CATV network without any intermediate components.

31. The adapter of claim 1, wherein the a network port is configured to be in direct communication with a server network interface.

32. The adapter of claim 1, wherein the primary network port is configured to be directly connected to a server network interface without any intermediate components.

33. The adapter of claim 1, wherein the secondary network ports are each configured to be in direct communication with a client MoCA network interface for one of the client MoCA devices.

34. The adapter of claim 33, wherein the secondary network ports are configured to be directly connected to the client network MoCA interface without any intermediate components.

35. The adapter of claim 1, wherein the two-way, high/low frequency band isolation and limited distribution means comprises a signal splitter that is configured to be directly connected to the primary network port without any intermediate components.

36. The adapter of claim 1, wherein the two-way, high/low frequency band isolation and limited distribution means comprises a signal splitter and a diplexer that includes a low frequency hand terminal that is configured to directly communicate with an output terminal of the signal splitter.

37. The adapter of claim 1, wherein the two-way, high/low frequency band isolation and limited distribution means comprises a signal splitter and a diplexer having a low frequency band terminal that is configured to be directly connected to an output terminal of the signal splitter without any intermediate components.

38. The adapter of claim 1, wherein the two-way, high/low frequency band isolation and limited distribution means comprises a diplexer that includes a common terminal that is configured to directly communicate with the primary network port.

39. The adapter of claim 1, wherein the two-way, high/low frequency band isolation and limited distribution means comprises a diplexer that includes a common terminal that is configured to be directly connected to the primary network port without any intermediate components.

40. The adapter of claim 1, wherein the two-way, high/low frequency band isolation and limited distribution means comprises a first diplexer having a first high frequency band terminal, and a second diplexer having a second high frequency band terminal that is configured to communicate with the first high frequency band terminal of the first diplexer so as to isolate high frequency band signals.

41. The adapter of claim 1, wherein the two-way, high/low frequency band isolation and limited distribution means comprises a first diplexer having a first high frequency band terminal and a second diplexer having a second high frequency band terminal configured to directly communicate with the first high frequency band terminal of the first diplexer so as to isolate high frequency band signals.

42. The adapter of claim 1, wherein the two-way, high/low frequency band isolation and limited distribution means comprises a first diplexer having a first high frequency band terminal and a second diplexer having a second high frequency band terminal configured to be directly connected to the first high frequency band terminal of the first diplexer without any intermediate components so as to isolate high frequency band signals.

43. The adapter of claim 1, wherein the two-way, high/low frequency band isolation and limited distribution means comprises a signal splitter, a first diplexer having a first low frequency band terminal configured to be in direct communication with a first output terminal of the signal splitter, and a second diplexer having a second low frequency band terminal configured to be in direct communication with a second output terminal of the splitter.

44. The adapter of claim 1, wherein the two-way, high/low frequency band isolation and limited distribution means comprises:
   a first signal splitter having a first splitter input terminal and a plurality of first splitter output terminals;
   a second signal splitter having a second splitter input terminal and a plurality of second splitter output terminals;
   a first diplexer having a first diplexer high frequency band terminal, a first diplexer low frequency band terminal configured to communicate with one of the plurality of first splitter output terminals, and a first diplexer common terminal configured to communicate with the primary network port; and
   a second diplexer having a second diplexer high frequency band terminal configured to communicate with the first diplexer high frequency band terminal of the first diplexer, a second diplexer low frequency band terminal configured to communicate with another one of the plurality of first splitter output terminals, and a second diplexer common terminal configured to communicate with the second splitter input terminal.

45. The adapter of claim 1, wherein the two-way, high/low frequency band isolation and limited distribution means comprises:
   a signal splitter including a first signal splitter having a first splitter input terminal, a plurality of first splitter output terminals, and a second signal splitter having a second splitter input terminal, and a plurality of second splitter output terminals;
   a first diplexer having a first diplexer high frequency band terminal, a first diplexer low frequency band terminal configured to be in direct communication with one of the plurality of first splitter output terminals, and a first diplexer common terminal configured to be in direct communication with the primary network port; and
   a second diplexer having a second diplexer high frequency band terminal configured to be in direct communication with the first diplexer high frequency band terminal of the first diplexer, a second diplexer low frequency band terminal configured to be in direct communication with another one of the plurality of first splitter output terminals, and a second diplexer common terminal configured to be in direct communication with the second splitter input terminal.

46. The adapter of claim 1, wherein the high/low frequency band isolation and limited distribution means comprises:
   a first signal splitter having a first splitter input terminal, and a plurality of first splitter output terminals;
   a second signal splitter having a second splitter input terminal, and a plurality of second splitter output terminals;
   a first diplexer having a first diplexer high frequency band terminal, a first diplexer low frequency band terminal configured to be directly connected to one of the plurality of first splitter output terminals without any intermediate components, and a first diplexer common terminal configured to be directly connected to the primary network port without any intermediate components; and
   a second diplexer having a second diplexer high frequency band terminal configured to be directly connected to the first diplexer high frequency band terminal of the first diplexer without any intermediate components, a second diplexer low frequency band terminal configured to be directly connected to another one of the plurality of first splitter output terminals without any intermediate components, and a second diplexer common terminal configured to be directly connected to the second splitter input terminal without any intermediate components.

47. The adapter of claim 1, wherein the two-way, high/low frequency band isolation and limited distribution means is configured to eliminate a need for a client network frequency band rejection filter, while blocking client frequency band signals from entering the CATV network, and while assuring that a high strength downstream network signal will be delivered to the client MoCA device during operation of the adapter.

48. The adapter of claim 1, wherein the two-way, high/low frequency band isolation and limited distribution means is configured to eliminate a need for a client network frequency band rejection filter, while blocking client frequency band signals from interfering with the CATV network, and while assuring that a high strength downstream network signal will be delivered to the client MoCA devices at all times during operation of the two-way, high/low frequency band isolation and limited distribution means.

49. The adapter of claim 1, wherein the low frequency band range is a predetermined signal range.

50. The adapter of claim 1, wherein the low frequency band range is a CATV network frequency range that encompasses both the upstream and downstream CATV signals.

51. The adapter of claim 1, wherein the low frequency band range comprises a downstream frequency band range and an upstream frequency band range.

52. The adapter of claim 51, wherein the downstream frequency band range comprises at least 54 MHz to 1002 MHz.

53. The adapter of claim 51, wherein the upstream frequency band range comprises 5 MHz to 42 MHz.

54. The adapter of claim 1, wherein the low frequency range comprises 5 MHz to 1002 MHz.

55. The adapter of claim 1, wherein the high frequency band range is the frequency band range of the client network signals.

56. The adapter of claim 55, wherein the frequency band range of the client MoCA network signals is greater than the frequency band range of CATV signals.

57. The adapter of claim 55, wherein the frequency band range of the client MoCA network signals comprises 1125 MHz to 1525 MHz.

58. The adapter of claim 1, wherein the two-way, high/low frequency band isolation and limited distribution means comprises a first high frequency band terminal and a second high frequency band terminal connected to the first high frequency terminal so as to confine transmission of client MoCA network signals only through a server network interface, and prevent the client MoCA network signals from being distributed to the CATV network.

59. The adapter of claim 58, wherein the two-way, high/low frequency band isolation and limited distribution means comprises a first diplexer having the first high frequency band terminal and a second diplexer having the second high frequency band terminal.

60. The adapter of claim 1, wherein the two-way, high/low frequency band isolation and limited distribution means comprises a plurality of signal splitters and a plurality of diplexers.

61. The adapter of claim 1, wherein the two-way, high/low frequency band isolation and limited distribution means comprises a first signal splitter, a second signal splitter, a first diplexer, and a second diplexer.

62. The adapter of claim 61, wherein first diplexer comprises a first high frequency band terminal, the second diplexer comprises a second high frequency band terminal configured to be connected to the first high frequency band terminal so as to limit transmission of high frequency band client network signals only through a server network interface and a client MoCA network interface, and prevent the high frequency band client MoCA network signals from being distributed to the CATV network.

63. The adapter of claim 1, wherein the two-way, high/low frequency band isolation and limited distribution means is configured to limit transmission of internal network signals only through a server network interface and a client MoCA network interface, and prevent client network signals from interfering with the CATV network.

64. The adapter of claim 1, wherein the downstream and upstream CATV signals and the client MoCA network signals are both made available to a server network interface and a client network interface so that the client MoCA devices are configured to interact with not only the downstream and upstream CATV signals, but also the client MoCA network signals, and the two-way, high/low frequency band isolation and limited distribution means is configured to isolate high and low frequency bands of signals so as to prevent high frequency client MoCA network signals from interfering with the CATV network.

65. The adapter of claim 1, wherein the two-way, high/low frequency band isolation and limited distribution means comprises a two-way splitter configured to distribute the downstream CATV signals to a server network interface with only a single reduction in signal strength caused by splitting the downstream CATV signals in the two-way splitter.

66. The adapter of claim 1, wherein the two-way, high/low frequency band isolation and limited distribution means comprises a two-way splitter configured to distribute the downstream CATV signals to a server network interface with only a single reduction in signal strength caused by splitting the downstream CATV signals in the two-way splitter so as to allow the server network interface to store multimedia content based on the single reduction in signal strength of the downstream CATV signals distributed from the two-way splitter.

67. The adapter of claim 1, wherein the two-way, high/low frequency band isolation and limited distribution means is configured to split a first network signal into a first split network signal copy having a first reduced signal-strength, distribute the first split network signal copy to a server network interface, split a second network signal into a second split network signal copy having a second reduced signal strength, and distribute the second split network signal copy to a client network interface, and wherein the second reduced signal strength is less than the first reduced signal strength.

68. The adapter of claim 67, wherein the two-way, high/low frequency band isolation and limited distribution means comprises a two-way signal splitter that is configured to split the first network signal into the first split network signal copy having the first reduced signal strength.

69. The adapter of claim 68, wherein the two-way, high/low frequency band isolation and limited distribution means comprises a four-way signal splitter that is configured to split the second network signal into the second split network signal copy having the second reduced signal strength.

70. The adapter of claim 1, wherein the two-way, high/low frequency band isolation and limited distribution means is configured to split a network signal into a first split network signal copy having a first reduced signal strength, split the first network signal copy into a second split network signal copy having a second reduced signal strength, and allow the second split network signal copy to be distributed to a client network interface, and wherein the second reduced signal strength is less than the first reduced signal strength.

71. The adapter of claim 1, wherein the two-way, high/low frequency band isolation and limited distribution means is configured to split a downstream network signal into a plurality of first split network signal copies each having a first reduced signal strength, allow one of the first split network signal copies to be distributed to a server network interface, split another one of the first network signal copies into a plurality of second split network signal copies each having a second reduced signal strength, and allow one of the second split network signal copies to be distributed to a client, network interface, and wherein the second reduced signal strength is less than the first reduced signal strength.

72. The adapter of claim 1, wherein the downstream and upstream CATV signals and the client network signals are both made available to a server network interface and a client network interface so that the client device is configured to interact with not only the downstream and upstream CATV signals, but also the client MoCA network signals, and the two-way, high/low frequency band isolation and limited distribution means is configured to isolate high and low frequency bands of signals at all times during operation so as to prevent high frequency client MoCA network signals from interfering with the CATV network.

73. An entry adapter for controlling upstream and downstream communications between a cable television (CATV) network and a client multimedia over coaxial alliance (MoCA) network comprising:
port means for allowing downstream and upstream CATV signals to be distributed between a CATV network and a plurality of MoCA client devices of a client MoCA network, wherein the port means comprises an entry port configured to be connected to the CATV network, a primary port, and secondary ports;
frequency band isolation and limited distribution means for allowing downstream and upstream CATV network signals to communicate with the client devices, blocking client network signals from being communicated upstream to the CATV network, splitting a network signal into a plurality of reduced signal-strength network signal copies to be communicated to the port means, and isolating network signals into a high frequency band range and a low frequency band range so as to allow downstream and upstream low frequency band CATV network signals to communicate with the plurality of MoCA client devices while blocking high frequency band client MoCA network signals from being communicated upstream to the CATV network so as to prevent the blocked high frequency band client MoCA network signals from interfering with the CATV network,
wherein frequency band isolation and limited distribution means is configured to transmit the downstream CATV networks between the entry port and the primary port without splitting the downstream CATV network signal more than once, and without amplifying the downstream CATV network signal,
wherein the frequency band isolation and limited distribution means is configured to block the downstream CATV signals from being communicated to the secondary ports, to block MoCA network signals from the secondary ports from being communicated to the entry port, to block MoCA network signals from the primary port from being communicated to the entry port, and to allow MoCA network signals to be communicated between the primary port and the secondary ports and between the secondary ports,
wherein the client MoCA network signals are in the high frequency and not in the low frequency band range; and
wherein the downstream and upstream CATV network signals are in the low frequency band range, and not in the high frequency band range.

74. The adapter of claim 73, wherein the client MoCA network comprises an in-home network.

75. The adapter of claim 73, wherein the port means comprises an entry port configured to be in communication with CATV network.

76. The adapter of claim 73, wherein the client MoCA devices comprises a subscriber device.

77. The adapter of claim 73, wherein the port means comprises a primary network port in communication with a server network interface, and a secondary network port in communication with a client network interface.

78. The adapter of claim 77, wherein the frequency band isolation and client network signal blocking means comprises a signal splitter that is configured to allow a first reduced signal-strength network signal copy to be communicated to the primary network port and allow a second reduced signal-strength network signal copy to be communicated to the secondary network port.

79. The adapter of claim 73, wherein the frequency band isolation and limited distribution means comprises a signal splitter that has a splitter input terminal, a first splitter output terminal, and a second splitter output terminal.

80. The adapter of claim 79, wherein the signal splitter is configured to split a CATV signal into a first network signal copy and a second network signal copy, communicate the first network signal copy to a primary network port, and communicate the second network signal copy to a secondary network port.

81. The adapter of claim 73, wherein the frequency band isolation and limited distribution means comprises a diplexer.

82. The adapter of claim 81, wherein the diplexer comprises a first diplexer and a second diplexer.

83. The adapter of claim 82, wherein the first diplexer includes a first high frequency band terminal, a first low frequency band terminal, and a first common terminal.

84. The adapter of claim 83, wherein the frequency band isolation and limited distribution means comprises a signal splitter, and the first low frequency band terminal of the first diplexer is configured to communicate with a first splitter output terminal of the signal splitter, and the first common terminal of the first diplexer is configured to communicate with a primary network port.

85. The adapter of claim 83, wherein the first diplexer is configured to allow network signals to be communicated in a predetermined high frequency band range through the first high frequency hand terminal, and allow network signals to be communicated in a predetermined low frequency band range through the first low frequency band terminal.

86. The adapter of claim 83, wherein the second diplexer includes a second high frequency band terminal, a second low frequency band terminal, and a second common terminal.

87. The adapter of claim 86, wherein the frequency band isolation and limited distribution means comprises a signal splitter, the second high frequency band terminal is configured to communicate with the first high frequency band terminal of the first diplexer, the second low frequency band terminal is configured to communicate with a second splitter output terminal of the signal splitter, and the second common terminal is configured to communicate with a secondary network port.

88. The adapter of claim 86, wherein the second diplexer is configured to allow network signals to be communicated in a predetermined high frequency band range through the second high frequency band terminal, and allow network signals to be communicated in a predetermined low frequency band range through the second low frequency band terminal.

89. The adapter of claim 73, wherein the frequency band isolation and limited distribution means comprises a first diplexer having a first high frequency band terminal and a second diplexer having a second high frequency band terminal, and the first high frequency band terminal of the first diplexer is configured to isolate and communicate high frequency band signals with the second high frequency band terminal of the second diplexer.

90. The adapter of claim 73, wherein the frequency band isolation and limited distribution means comprises one or more passive electrical components.

91. The adapter of claim 73, wherein the adapter is configured such that power is only received therein through the downstream and upstream CATV signals and the client network signals.

92. The adapter of claim 73, wherein the downstream and upstream CATV signals are distributed through the frequency band isolation and limited distribution means without being attenuated.

93. The adapter of claim 73, wherein the frequency band isolation and limited distribution means comprises a diplexer having a first common terminal and a second common terminal, and the port means comprises a primary network port that is configured to communicate with the first common terminal of the diplexer and a secondary network port that is configured to communicate with the second common terminal of the diplexer.

94. The adapter of claim 73, wherein the frequency band isolation and limited distribution means comprises a first signal splitter, and further comprising a second signal splitter.

95. The adapter of claim 94, wherein the first signal splitter comprises a two-way splitter.

96. The adapter of claim 95, wherein the second signal splitter comprises a four-way splitter.

97. The adapter of claim 94, wherein the second signal splitter comprises a second splitter input terminal and a second splitter output terminal.

98. The adapter of claim 94, wherein the second signal splitter comprises a second splitter input terminal and a plurality of second splitter output terminals.

99. The adapter of claim 73, wherein the port means comprises a plurality of secondary network ports, and the client device comprises a plurality of client devices.

100. The adapter of claim 99, wherein the frequency band isolation and limited distribution means comprises a first signal splitter, and further comprising a second signal splitter configured to split a network signal into a plurality of network signal copies, and communicate the plurality of network signal copies to the plurality of secondary network ports.

101. The adapter of claim 100, wherein the entry port is configured to be in direct communication with the CATV network.

102. The adapter of claim 73, wherein the entry port is configured to be directly connected to the CATV network without any intermediate components.

103. The adapter of claim 73, wherein the primary network port is configured to be in direct communication with a server network interface.

104. The adapter of claim 73, wherein the primary network port is configured to be directly connected to a server network interface without any intermediate components.

105. The adapter of claim 73, wherein the secondary network port that is configured to be in direct communication with a client network interface for a client device.

106. The adapter of claim 105, wherein the secondary network port that is configured to be directly connected to the client network interface without any intermediate components.

107. The adapter of claim 73, wherein the primary network port, and the frequency band isolation and limited distribution means comprises a signal splitter that is configured to be directly connected to the primary network port without any intermediate components.

108. The adapter of claim 73, wherein the frequency band isolation and limited distribution means comprises a signal splitter and a diplexer that includes a low frequency band terminal that is configured to directly communicate with an output terminal of the signal splitter.

109. The adapter of claim 73, wherein the frequency band isolation and limited distribution means comprises a signal splitter and a diplexer having a low frequency band terminal that is configured to be directly connected to an output terminal of the signal splitter without any intermediate components.

110. The adapter of claim 73, wherein the frequency band isolation and limited distribution means comprises a diplexer that includes a common terminal that is configured to directly communicate with the primary network port.

111. The adapter of claim 73, wherein the frequency band isolation and limited distribution means comprises a diplexer that includes a common terminal that is configured to be directly connected to the primary network port without any intermediate components.

112. The adapter of claim 73, wherein the frequency band isolation and limited distribution means comprises a first diplexer having a first high frequency band terminal, and a second diplexer having a second high frequency band terminal that is configured to communicate with the first high frequency band terminal of the first diplexer so as to isolate high frequency band signals.

113. The adapter of claim 73, wherein the frequency band isolation and limited distribution means comprises a first diplexer having a first high frequency band terminal and a second diplexer having a second high frequency band terminal configured to directly communicate with the first high frequency band terminal of the first diplexer so as to isolate high frequency band signals.

114. The adapter of claim 73, wherein the frequency band isolation and limited distribution means comprises a first diplexer having a first high frequency band terminal and a second diplexer having a second high frequency band terminal configured to be directly connected to the first high frequency band terminal of the first diplexer without any intermediate components so as to isolate high frequency band signals.

115. The adapter of claim 73, wherein the frequency band isolation and limited distribution means comprises a signal splitter, a first diplexer having a first low frequency band terminal configured to be in direct communication with a first output terminal of the signal splitter, and a second diplexer having a second low frequency band terminal configured to be in direct communication with a second output terminal of the splitter.

116. The adapter of claim 73, wherein the frequency band isolation and limited distribution means comprises:
a first signal splitter including a first splitter input terminal and a plurality of first splitter output terminals;
a second signal splitter including a second splitter input terminal and a plurality of second splitter output terminals;
a first diplexer including a first diplexer high frequency band terminal, a first diplexer low frequency band terminal configured to be in communication with one of the plurality of first splitter output terminals, and a first diplexer common terminal configured to be in communication with the primary network port; and
a second diplexer including a second diplexer high frequency band terminal configured to be in communication with the first diplexer high frequency band terminal of the first diplexer, a second diplexer low frequency band terminal configured to be in communication with another one of the plurality of first splitter output terminals, and a second diplexer common terminal configured to be in communication with the second splitter input terminal.

117. The adapter of claim 73, wherein the frequency band isolation and limited distribution means comprises:
a signal splitter including a first signal splitter having a first splitter input terminal, a plurality of first splitter output terminals, and a second signal splitter having a second splitter input terminal, and a plurality of second splitter output terminals;
a first diplexer having a first diplexer high frequency hand terminal, a first diplexer low frequency band terminal configured to be in direct communication with one of the plurality of first splitter output terminals, and a first diplexer common terminal configured to be in direct communication with a primary network port; and
a second diplexer having a second diplexer high frequency band terminal configured to be in direct communication with the first diplexer high frequency band terminal of the first diplexer, a second diplexer low frequency band terminal configured to be in direct communication with another one of the plurality of first splitter output terminals, and a second diplexer common terminal configured to be in direct communication with the second splitter input terminal.

118. The adapter of claim 73, wherein the frequency band isolation and limited distribution means comprises:
a first signal splitter having a first splitter input terminal, a plurality of first splitter output terminals;
a second signal splitter having a second splitter input terminal, and a plurality of second splitter output terminals;
a first diplexer having a first diplexer high frequency band terminal, a first diplexer low frequency band terminal configured to be directly connected to one of the plurality of first splitter output terminals without any intermediate components, and a first diplexer common terminal configured to be directly connected to a primary network port without any intermediate components; and
a second diplexer having a second diplexer high frequency band terminal configured to be directly connected to the first diplexer high frequency band terminal of the first diplexer without any intermediate components, a second diplexer low frequency band terminal configured to be directly connected to another one of the plurality of first splitter output terminals without any intermediate components, and a second diplexer common terminal configured to be directly connected to the second splitter input terminal without any intermediate components.

119. The adapter of claim 73, wherein the frequency band isolation and limited distribution means is configured to eliminate a need for a client network frequency band rejection filter, while blocking client frequency band signals from entering the CATV network, and while assuring that a high strength downstream network signal will be delivered to the client device during operation of the adapter.

120. The adapter of claim 73, wherein the frequency band isolation and limited distribution means is configured to eliminate a need for a client network frequency band rejection filter, while blocking client frequency band signals from interfering with the CATV network, and while assuring that a high strength downstream network signal will be delivered to the client device at all times during operation of the frequency band isolation and limited distribution means.

121. The adapter of claim 73, wherein the low frequency band range is a predetermined signal range.

122. The adapter of claim 73, wherein the low frequency band range is a CATV network frequency range that encompasses both the upstream and downstream CATV signals.

123. The adapter of claim 73, wherein the low frequency band range comprises a downstream frequency band range and an upstream frequency band range.

124. The adapter of claim 123, wherein the downstream frequency band range comprises at least 54 MHz to 1002 MHz.

125. The adapter of claim 123, wherein the upstream frequency band range comprises 5 MHz to 42 MHz.

126. The adapter of claim 125, wherein the low frequency range comprises 5 MHz to 1002 MHz.

127. The adapter of claim 125, wherein the high frequency band range is the frequency band range of the client network signals.

128. The adapter of claim 127, wherein the frequency band range of the client network signals is greater than the frequency band range of CATV signals.

129. The adapter of claim 127, wherein the frequency band range of the client network signals comprises 1125 MHz to 1525 MHz.

130. The adapter of claim 73, wherein the frequency band isolation and limited distribution means comprises a first high frequency band terminal and a second high frequency band terminal connected to the first high frequency terminal so as to confine transmission of client network signals only through a server network interface, and prevent the client network signals from interfering with the CATV network.

131. The adapter of claim 130, wherein the frequency band isolation and limited distribution means comprises a first diplexer having the first high frequency band terminal and a second diplexer having the second high frequency band terminal.

132. The adapter of claim 73, wherein the frequency band isolation and limited distribution means comprises a plurality of signal splitters and a plurality of diplexers.

133. The adapter of claim 73, wherein the frequency band isolation and limited distribution means comprises a first diplexer and a second diplexer.

134. The adapter of claim 133, wherein the first diplexer comprises a first high frequency band terminal, the second diplexer comprises a second high frequency band terminal configured to be connected to the first high frequency band terminal so as to limit transmission of high frequency band client network signals only through a server network interface and a client network interface, and prevent the high frequency band client network signals from interfering with the CATV network.

135. The adapter of claim 73, wherein the frequency band isolation and limited distribution means is configured to limit transmission of internal network signals only through a server network interface and a client network interface, and prevent client network signals from interfering with the CATV network.

136. The adapter of claim 73, wherein the downstream and upstream CATV signals and the client network signals are both made available to a server network interface and a client network interface so that the client device is configured to interact with not only the downstream and upstream CATV signals, but, also the client network signals, and the frequency band isolation and limited distribution means is configured to isolate high and low frequency bands of signals so as to prevent high frequency client network signals from interfering with the CATV network.

137. The adapter of claim 73, wherein the frequency band isolation and limited distribution means comprises a two-way splitter configured to distribute the downstream CATV signals to a server network interface with only a single reduction in signal strength caused by splitting the downstream CATV signals in the two-way splitter.

138. The adapter of claim 73, wherein the frequency band isolation and limited distribution means comprises a two-way splitter configured to distribute the downstream CATV signals to a server network interface with only a single reduction in signal strength caused by splitting the downstream CATV signals in the two-way splitter so as to allow the server network interface to store multimedia content based on the single reduction in signal strength of the downstream CATV signals distributed from the two-way splitter.

139. The adapter of claim 73, wherein the frequency band isolation and limited distribution means is configured to split a first network signal into a first split network signal copy having a first reduced signal-strength, distribute the first split network signal copy to a server network interface, split a second network signal into a second split network signal copy having a second reduced signal strength, and distribute the second split network signal copy to a client network interface, and wherein the second reduced signal strength is less than the first reduced signal strength.

140. The adapter of claim 139, wherein the frequency band isolation and limited distribution means comprises a two-way signal splitter that is configured to split the first network signal into the first split network signal copy having the first reduced signal strength.

141. The adapter of claim 139, wherein the frequency band isolation and limited distribution means comprises a four-way signal splitter that is configured to split the second network signal into the second split network signal copy having the second reduced signal strength.

142. The adapter of claim 73, wherein the frequency band isolation and limited distribution means is configured to split a network signal into a first split network signal copy having a first reduced signal strength, split the first network signal copy into a second split network signal copy having a second reduced signal strength, and allow the second split network signal copy to be distributed to a client network interface, and wherein the second reduced signal strength is less than the first reduced signal strength.

143. The adapter of claim 73, wherein the frequency band isolation and limited distribution means is configured to split a downstream network signal into a plurality of first split network signal copies each having a first reduced signal strength, allow one of the first split network signal copies to be distributed to a server network interface, split another one of the first network signal copy into a plurality of second split network signal copies each having a second reduced signal strength, and allow the second split network signal copy to be distributed to a client network interface, and wherein the second reduced signal strength is less than the first reduced signal strength.

144. The entry adapter of claim 73, wherein the entry adapter is configured to permit the plurality of MoCA client devices to communicate with each other to deliver multi-media content using a MoCA communication protocol over the client MoCA network without having to physically relocate the MoCA client devices from one location to another.

145. The entry adapter of claim 73, wherein the frequency band isolation and limited distribution means is configured to transmit the downstream CATV signals between the CATV network and the client MOCA network without reducing a signal strength therebetween to an extent that disrupts signal communication from the CATV network to the client MoCA network.

146. The entry adapter of claim 73, wherein the frequency band isolation and limited distribution means comprises a first diplexer having a first high frequency band terminal, and a second diplexer having a second high frequency band terminal, wherein the first high frequency band terminal is connected to the second high frequency band terminal so as to limit transmission of high frequency band client network signals only through a server network interface and a client network interface, and prevent the high frequency band client network signals from interfering with the CATV network.

147. An entry adapter for distributing downstream and upstream external network signals between an external network and a client device in an internal network, and distributing internal network signals in the internal network, while frequency band blocking the internal network signals from being distributed to the external network, the entry adapter comprising:

input port means for communicating with an external network, so as to receive downstream external network signals from the external network and provide upstream external network signals to the external network;

primary network port means for communicating with a server network interface;

secondary network port means for communicating with a client multimedia over coaxial alliance (MoCA) network interface; and network communication and internal network signal blocking means for allowing the downstream and upstream external network signals to communicate with a client device in the internal network, and for frequency band blocking internal network signals from being communicated upstream to the external network;

wherein the network communication and internal network signal blocking means comprises:

signal splitter means for splitting a network signal into a plurality of reduced signal-strength network signal copies to be communicated to the primary and secondary port means; and diplexer means for separating network signals into a high frequency band network signal range and a low frequency band network signal range so as to allow downstream and upstream low frequency band network signals to communicate with the client device in the internal network while frequency band blocking high frequency band internal network signals from being communicated upstream to the external network, wherein the internal network signals are in the high frequency band network signal range, and not in the low frequency band network signal range, wherein the downstream and upstream network signals are in the low frequency band network signal range, and not in the high frequency band network signal range, wherein the network communication and internal network signal blocking means are configured to transmit the downstream external network signals between the external network and the internal network without reducing a signal strength therebetween to an extent that disrupts signal communications from the external network to the internal network, and wherein the signal splitter means and the diplexer means are together configured to permit transmission of internal network signals only through the internal network, and block the internal network signals from being distributed to the external network.

148. The entry adapter of claim 147, wherein the signal splitter means are configured to allow a first reduced signal-strength network signal copy to be communicated to the primary network port means and allow a second reduced signal-strength network signal copy to be communicated to the secondary network port means.

149. The entry adapter of claim 148, wherein the signal splitter means are configured to split the network signal into a first network signal copy and a second network signal copy, communicate the first network signal copy to the primary network port means, and communicate the second network signal copy to the secondary network port means.

150. The entry adapter of claim 148, wherein the primary network port means are configured to communicate with a first common terminal of the diplexer means, and the secondary network port means are configured to communicate with a second common terminal of the diplexer means.

151. The entry adapter of claim 148, wherein the diplexer means comprises first diplexer means having a first common terminal, and second diplexer means having a second common terminal, the primary network port means are configured to communicate with the first common terminal of the first diplexer means, and the secondary network port means are configured to communicate with the second common terminal of the second diplexer means.

152. The entry adapter of claim 151, wherein the first diplexer means comprises a first high frequency band terminal, the second diplexer means comprises a second high frequency band terminal configured to be connected to the first high frequency band terminal so as to limit transmission of high frequency band internal network signals only through the server network interface and the client MoCA network interface, and prevent the high frequency band internal network signals from being distributed to the external network.

153. The entry adapter of claim 148, wherein the secondary network port means comprises a plurality of secondary network ports, the client network interface comprises a plurality of client MoCA network interfaces, and the client device comprises a plurality of client MoCA devices.

154. The entry adapter of claim 153, wherein the signal splitter means comprises a first signal splitter, and further comprising a second signal splitter configured to split a network signal into a plurality of network signal copies, and communicate the plurality of network signal copies to the plurality of secondary network ports, the plurality of client network interfaces, and the plurality of client devices.

155. The entry adapter of claim 148, wherein client device comprises a subscriber device.

156. The entry adapter of claim 155, wherein the secondary network port means are configured to be in direct communication with the client network interface for the subscriber device.

157. The entry adapter of claim 148, wherein the secondary network port means are configured to be directly connected to the client MoCA network interface.

158. The entry adapter of claim 147, wherein the server network interface is configured to send and receive downstream and upstream network signals between the external network and the client device.

159. The entry adapter of claim 158, wherein the server network interface is configured to store downstream network signals and supply network signals to the client MoCA network interface based on the stored downstream network signals.

160. The entry adapter of claim 147, wherein the client network interface is configured to send and receive network signals from the client device.

161. The entry adapter of claim 147, wherein the primary network port means are configured to be in direct communication with the server network interface.

162. The entry adapter of claim 147, wherein the primary network port means are configured to be directly connected to the server network interface without any intermediate components.

163. The entry adapter of claim 147, wherein the diplexer means comprises a first high frequency band terminal and a second high frequency band terminal connected to the first high frequency terminal so as to confine transmission of internal network signals only through the server network interface, and prevent the internal network signals from being distributed to the external network.

164. The entry adapter of claim 147, wherein the signal splitter means comprises a two-way splitter configured to distribute the downstream network signals to the server network interface with only a single reduction in signal strength caused by splitting the downstream network signals in the two-way splitter.

165. The entry adapter of claim 147, wherein the signal splitter means comprises a two-way splitter configured to distribute the downstream network signals to the server network interface with only a single reduction in signal strength caused by splitting the downstream network signals in the two-way splitter so as to allow the server network interface to store multimedia content based on the single reduction in signal strength of the downstream network signals distributed from the two-way splitter.

166. The entry adapter of claim 147, wherein the signal splitter means are configured to split a network signal into a first split network signal copy having a first reduced signal-strength, distribute the first split network signal copy to the server network interface, split the network signal into a second split network signal copy having a second reduced signal strength, and distribute the second split network signal copy to the client network interface, and wherein the second reduced signal strength is less than the first reduced signal strength.

167. The entry adapter of claim 147, wherein the signal splitter means are configured to split a downstream network signal into a plurality of first split network signal copies each having a first reduced signal strength, distribute one of the first split network signal copies to the server network interface, split another one of the first split network signal copies into a plurality of second split network signal copies each having a second reduced signal strength, and distribute one of the second split network signal copies to the client MoCA network interface, and wherein the second reduced signal strength is less than the first reduced signal strength.

168. The entry adapter of claim 147, wherein the downstream and upstream network signals and the internal network signals are both made available to each of the server and client MoCA network interfaces so that the client device is configured to interact with not only the downstream and upstream network signals, but also the internal network signals, and the network communications and internal network signal blocking means are configured to separate high and low frequency bands of signals so as to isolate and prevent high frequency internal network signals from reaching the external network.

169. The entry adapter of claim 147, wherein the signal splitter means are configured to split a network signal into a first split network signal copy having a first reduced signal strength, split the first split network signal copy into a second split network signal copy having a second reduced signal strength, and distribute the second split network signal copy to the client MoCA network interface, and a client device in communication with the client network device, and wherein the second reduced signal strength is less than the first reduced signal strength.

170. The entry adapter of claim 169, wherein the signal splitter means comprises a two-way signal splitter that is configured to split the network signal into the first split network signal copy having the first reduced signal strength.

171. The entry adapter of claim 169, wherein the signal splitter means comprises a four-way signal splitter that is configured to split the first split network signal into the second split network signal copy having the second reduced signal strength.

172. The entry adapter of claim 147, wherein the downstream and upstream network signals and the internal network signals are both made available to each of the server and client MoCA network interfaces so that a client MoCA device coupled to the server network interface is configured to interact with not only the downstream and upstream network signals, but also the internal network signals, and the network communications and internal network signal blocking means are configured to separate high and low frequency bands of signals at all times during operation so as to isolate and prevent high frequency internal network signals from reaching the external network.

173. The entry adapter of claim 147, wherein the external network comprises a cable television (CATV) network.

174. The entry adapter of claim 173, wherein upstream and downstream external network signals are in a frequency range of from about 5 MHz to about 1002 MHz.

175. The entry adapter of claim 147, wherein the internal network comprises an in-home network.

176. The entry adapter of claim 175, wherein the in-home network signals are in a frequency range of from about 1125 MHz to about 1675 MHz.

177. The entry adapter of claim 147, wherein the input port means further comprises an entry port configured to be in communication with a cable television network.

178. The entry adapter of claim 147, wherein the signal splitter means has a splitter input terminal, a first splitter output terminal, and a second splitter output terminal.

179. The entry adapter of claim 147, wherein the diplexer means comprises first diplexer means and second diplexer means.

180. The entry adapter of claim 179, wherein the first diplexer means includes a first high frequency band terminal, a first low frequency band terminal, and a first common terminal.

181. The entry adapter of claim 180, wherein the first low frequency band terminal is configured to communicate with a first splitter output terminal of the signal splitter means, and the first common terminal is configured to communicate with the primary network port means.

182. The entry adapter of claim 181, wherein the first diplexer means are configured to communicate network signals in a predetermined high frequency band range through the first high frequency band terminal, and communicate network signals in a predetermined low frequency band range through the first low frequency band terminal.

183. The entry adapter of claim 181, wherein the second diplexer means includes a second high frequency band terminal, a second low frequency band terminal, and a second common terminal.

184. The entry adapter of claim 183, wherein the signal splitter means are configured to allow a first reduced signal-strength network signal copy to be communicated to the primary network port means and allow a second reduced signal-strength network signal copy to be communicated to the secondary network port means, and wherein the second high frequency band terminal is configured to communicate with the first high frequency band terminal of the first diplexer means, the second low frequency band terminal is configured to communicate with a second splitter output terminal of the signal splitter means, and the second common terminal is configured to communicate with the secondary network port means.

185. The entry adapter of claim 183, wherein the second diplexer means are configured to communicate network signals in a predetermined high frequency band range through the second high frequency band terminal, and communicate network signals in a predetermined low frequency band range through the second low frequency band terminal.

186. The entry adapter of claim 147, wherein the diplexer means comprises a first diplexer having a first high frequency band terminal and a second diplexer having a second high frequency band terminal, and the first high frequency band terminal of the first diplexer is configured to communicate with the second high frequency band terminal of the second diplexer.

187. The entry adapter of claim 147, wherein the signal splitter means and the diplexer means are passive electrical components.

188. The entry adapter of claim 147, wherein power received by the entry adapter is received only through the downstream and upstream network signals and the internal network signals.

189. The entry adapter of claim 147, wherein the downstream and upstream network signals are distributed through the network communications and internal network signal blocking means without being substantially attenuated.

190. The entry adapter of claim 147, wherein the signal splitter means comprises a first signal splitter, and further comprises a second signal splitter.

191. The entry adapter of claim 190, wherein the first signal splitter comprises a two-way splitter.

192. The entry adapter of claim 190, wherein the second signal splitter comprises a four-way splitter.

193. The entry adapter of claim 192, wherein the second signal splitter comprises a second splitter input terminal and a second splitter output terminal.

194. The entry adapter of claim 192, wherein the second signal splitter comprises a second splitter input terminal and a plurality of second splitter output terminals.

195. The entry adapter of claim 147, wherein the input port means includes an entry port that is configured to be in direct communication with the external network.

196. The entry adapter of claim 147, wherein the input port means includes an entry port that is configured to be directly connected to the external network without any intermediate components.

197. The entry adapter of claim 147, wherein the signal splitter means are configured to be directly connected to the primary network port means without any intermediate components.

198. The entry adapter of claim 147, wherein the diplexer means includes a low frequency band terminal that is configured to directly communicate with an output terminal of the signal splitter means.

199. The entry adapter of claim 147, wherein diplexer means includes a low frequency band terminal that is configured to be directly connected to an output terminal of the signal splitter means without any intermediate components.

200. The entry adapter of claim 147, wherein the diplexer means includes a common terminal that is configured to directly communicate with the primary network port means.

201. The entry adapter of claim 147, wherein the diplexer means includes a common terminal that is configured to be directly connected to the primary network port means without any intermediate components.

202. The entry adapter of claim 147, wherein the diplexer means includes a first diplexer having a first high frequency band terminal and a second diplexer having a second high frequency band terminal configured to communicate with the first high frequency band terminal of the first diplexer.

203. The entry adapter of claim 147, wherein the diplexer means includes a first diplexer having a first high frequency band terminal and a second diplexer having a second high frequency band terminal configured to directly communicate with the first high frequency band terminal of the first diplexer.

204. The entry adapter of claim 147, wherein the diplexer means includes a first diplexer having a first high frequency band terminal and a second diplexer having a second high frequency band terminal configured to be directly connected to the first high frequency band terminal of the first diplexer without any intermediate components.

205. The entry adapter of claim 147, wherein the diplexer means comprises a first diplexer having a first low frequency band terminal configured to be in direct communication with a first output terminal of the signal splitter means and a second diplexer having a second low frequency band terminal configured to be in direct communication with a second output terminal of the signal splitter means.

206. The entry adapter of claim 147, wherein the signal splitter means comprises a first signal splitter having a first splitter input terminal, a plurality of first splitter output terminals, and a second signal splitter having a second splitter input terminal, and a plurality of second splitter output terminals, wherein the diplexer means comprises a first diplexer having a first diplexer high frequency band terminal, a first diplexer low frequency band terminal configured to be in communication with one of the plurality of first splitter output terminals, and a first diplexer common terminal configured to be in communication with the primary network port means, and a second diplexer having a second diplexer high frequency hand terminal configured to be in communication with the first diplexer high frequency band terminal of the first diplexer, a second diplexer low frequency band terminal configured to be in communication with another one of the plurality of first splitter output terminals, and a second diplexer common terminal configured to be in communication with the second splitter input terminal.

207. The entry adapter of claim 147, wherein the signal splitter means comprises a first signal splitter having a first splitter input terminal, a plurality of first splitter output terminals, and a second signal splitter having a second splitter input terminal, and a plurality of second splitter output terminals, the diplexer means comprises a first diplexer having a first diplexer high frequency band terminal, a first diplexer low frequency band terminal configured to be in direct communication with one of the plurality of first splitter output terminals, and a first diplexer common terminal configured to be in direct communication with the primary network port means, and a second diplexer having a second diplexer high frequency band terminal configured to be in direct communication with the first diplexer high frequency band terminal of the first diplexer, a second diplexer low frequency band terminal configured to be in direct communication with another one of the plurality of first splitter output terminals, and a second diplexer common terminal configured to be in direct communication with the second splitter input terminal.

208. The entry adapter of claim 147, wherein the signal splitter means comprises a first signal splitter having a first splitter input terminal, a plurality of first splitter output terminals, and a second signal splitter having a second splitter input terminal, and a plurality of second splitter output terminals, the diplexer means comprises a first diplexer having a first diplexer high frequency band terminal, a first diplexer low frequency band terminal configured to be directly connected to one of the plurality of first splitter output terminals without any intermediate components and a first diplexer common terminal configured to be directly connected to the primary network port means without any intermediate components, and a second diplexer having a second diplexer high frequency band terminal configured to be directly connected to the first diplexer high frequency band terminal of the first diplexer without any intermediate components, a second diplexer low frequency band terminal configured to be directly connected to another one of the plurality of first splitter output terminals without any intermediate components, and a second diplexer common terminal configured to be directly connected to the second splitter input terminal without any intermediate components.

209. The entry adapter of claim 147, wherein the network communication and internal network signal blocking means are configured to eliminate a need for an internal network frequency band rejection filter, while blocking internal frequency band signals from entering the external network, and while assuring that a high strength downstream network signal will be delivered to the client device during operation of the entry adapter.

210. The entry adapter of claim 147, wherein the network communication internal network signal blocking means are configured to eliminate a need for an internal network frequency band rejection filter, while blocking internal frequency band signals from entering the external network, and while assuring that a high strength downstream network signal will be delivered to the client device at all times during operation of the entry adapter.

211. The entry adapter of claim 147, wherein the low frequency band network signal range is a predetermined signal range.

212. The entry adapter of claim 147, wherein the low frequency band network signal range is a cable television network (CATV) frequency range that encompasses both the upstream and downstream network signals.

213. The entry adapter of claim 147, wherein the low frequency band network signal range comprises a downstream frequency band range and an upstream frequency band range.

214. The entry adapter of claim 213, wherein the downstream frequency band range comprises at least 54 MHz to 1002 MHz.

215. The entry adapter of claim 213, wherein the upstream frequency band range comprises 5 MHz to 42 MHz.

216. The entry adapter of claim 147, wherein the low frequency band network signal range comprises 5 MHz to 1002 MHz.

217. The entry adapter of claim 147, wherein the high frequency band network signal range is the frequency band range of the internal network signals.

218. The entry adapter of claim 217, wherein the frequency band range of the internal network signals is higher than the frequency band range employed for cable television (CATV) signals.

219. The entry adapter of claim 218, wherein the frequency band range of the internal network signals comprises 1125 MHz to 1525 MHz.

220. The entry adapter of claim 147, wherein the signal splitter means comprises a first signal splitter and a second signal splitter, and the diplexer means comprises a first diplexer and a second diplexer.

221. The entry adapter of claim 147, wherein the network communication and internal network signal blocking means are configured to eliminate a need for an internal network frequency band rejection filter, while blocking internal frequency band signals from entering the external network, and while assuring that a high strength downstream network signal will be delivered to the client device at all times during operation of the entry adapter.

* * * * *